United States Patent
Hagerty et al.

(10) Patent No.: US 8,433,443 B2
(45) Date of Patent: Apr. 30, 2013

(54) METHOD FOR ON-LINE MONITORING AND CONTROL OF POLYMERIZATION PROCESSES AND REACTORS TO PREVENT DISCONTINUITY EVENTS

(75) Inventors: Robert O. Hagerty, La Porte, TX (US); Ian D. Burdett, Charleston, WV (US); Marc L. DeChellis, Houston, TX (US); F. David Hussein, Cross lanes, WV (US); Eric J. Markel, Kingwood, TX (US); Michael E. Muhle, Kingwood, TX (US); Richard B. Pannell, Kingwood, TX (US); Daniel P. Zilker, Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 1145 days.

(21) Appl. No.: 12/214,469

(22) Filed: Jun. 19, 2008

(65) Prior Publication Data

US 2008/0319583 A1   Dec. 25, 2008

Related U.S. Application Data

(63) Continuation of application No. PCT/US2008/000732, filed on Jan. 18, 2008.

(60) Provisional application No. 60/901,906, filed on Feb. 16, 2007.

(51) Int. Cl.
*G05B 21/00*   (2006.01)

(52) U.S. Cl.
USPC ............ 700/269; 700/266; 700/268; 702/22; 702/31; 702/32; 526/61; 526/59; 526/60; 422/131; 422/139

(58) Field of Classification Search ............... 700/266, 700/268, 269; 702/22, 31, 32; 526/61, 59, 526/60; 422/131, 139
See application file for complete search history.

(56) References Cited

U.S. PATENT DOCUMENTS

| | | | |
|---|---|---|---|
| 4,532,311 A | 7/1985 | Fulks et al. | 526/62 |
| 4,543,399 A | 9/1985 | Jenkins, III et al. | 526/70 |

(Continued)

FOREIGN PATENT DOCUMENTS

| | | |
|---|---|---|
| WO | WO 86/07065 | 12/1986 |
| WO | WO 99/02573 | 1/1999 |

(Continued)

OTHER PUBLICATIONS

"Acoustic Emission Technology—a New Sensing Technique for Optimising Polyolefin Production," Process Analysis and Automation Ltd, pp. 1-12 (2000).

(Continued)

*Primary Examiner* — Brian R Gordon
*Assistant Examiner* — Shogo Sasaki
(74) *Attorney, Agent, or Firm* — Kristina Leavitt; Jennifer A. Schmidt; Leandro Arechederra, III

(57) ABSTRACT

Generally, a method of monitoring a polymerization reaction in a fluid bed reactor to generate, in on-line fashion, data indicative of the imminent occurrence of a discontinuity event (for example, sheeting) and optionally also control the reaction to prevent the occurrence of the discontinuity event is provided. Typical embodiments include the steps of generating in on-line fashion at least one of bed static data indicative of static charge in the fluidized bed and carryover static data indicative of carryover static; and generating at least one of temperature data (in on-line fashion using at least one monitored reaction parameter) indicative of a first temperature and acoustic emission data indicative of resin stickiness in the reactor, where the first temperature is indicative of at least one of degree of resin stickiness in the reactor and a characteristic of melting behavior of polymer resin in the reactor in the presence of at least one diluent.

30 Claims, 6 Drawing Sheets

U.S. PATENT DOCUMENTS

| | | | |
|---|---|---|---|
| 4,588,790 A | 5/1986 | Jenkins, III et al. | 526/70 |
| 5,352,749 A | 10/1994 | DeChellis et al. | 526/68 |
| 5,405,922 A | 4/1995 | DeChellis et al. | 526/68 |
| 5,436,304 A | 7/1995 | Griffin et al. | 526/68 |
| 5,648,581 A | 7/1997 | Kubo et al. | 585/501 |
| 6,008,662 A | 12/1999 | Newton et al. | 324/724 |
| 7,122,607 B2 | 10/2006 | Hagerty et al. | 526/73 |
| 2003/0121330 A1* | 7/2003 | Muhle et al. | 73/600 |
| 2004/0132931 A1 | 7/2004 | Muhle et al. | 526/88 |
| 2005/0148742 A1 | 7/2005 | Hagerty et al. | 526/68 |
| 2005/0267269 A1* | 12/2005 | Hagerty et al. | 526/68 |
| 2006/0130870 A1 | 6/2006 | Cai et al. | 134/1 |
| 2007/0060721 A1 | 3/2007 | Muhle et al. | 526/59 |
| 2007/0073010 A1* | 3/2007 | Pannell et al. | 526/73 |
| 2008/0065360 A1 | 3/2008 | Pannell et al. | 703/2 |

FOREIGN PATENT DOCUMENTS

| | | |
|---|---|---|
| WO | WO 02/30993 | 4/2002 |
| WO | WO 03/051929 | 6/2003 |
| WO | WO 2005/113615 | 12/2005 |
| WO | WO 2006/107437 | 10/2006 |
| WO | WO 2008/030313 | 3/2008 |

OTHER PUBLICATIONS

"Agglomeration Detection by Acoustic Emission," Process Analysis and Automation Ltd, Application Note: 2002/111 (2000).

* cited by examiner

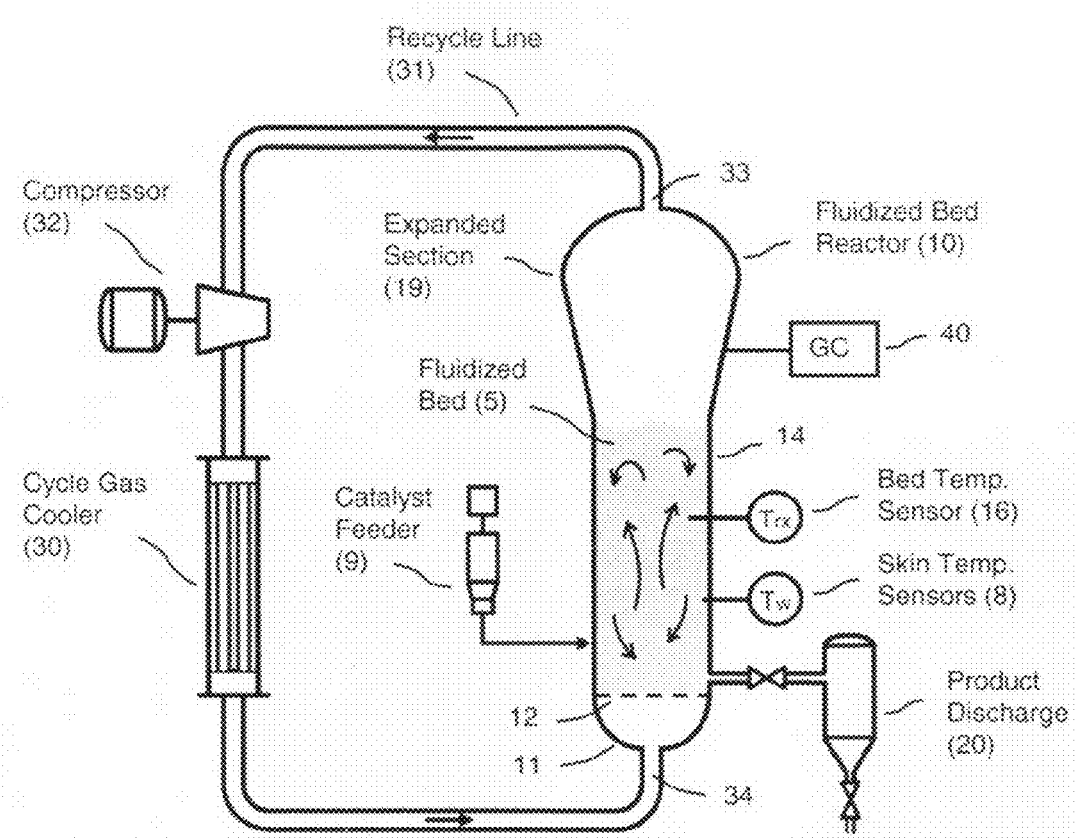

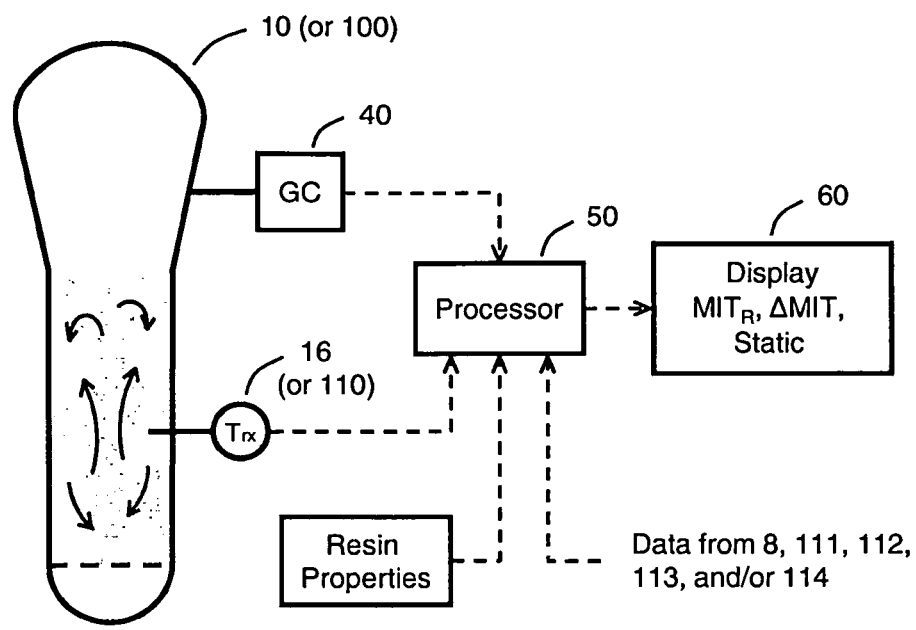
Figure 2 – Process For Monitoring And Control of Reactor Stickiness and/or Static Figure 3 – First Melt DSC Curve
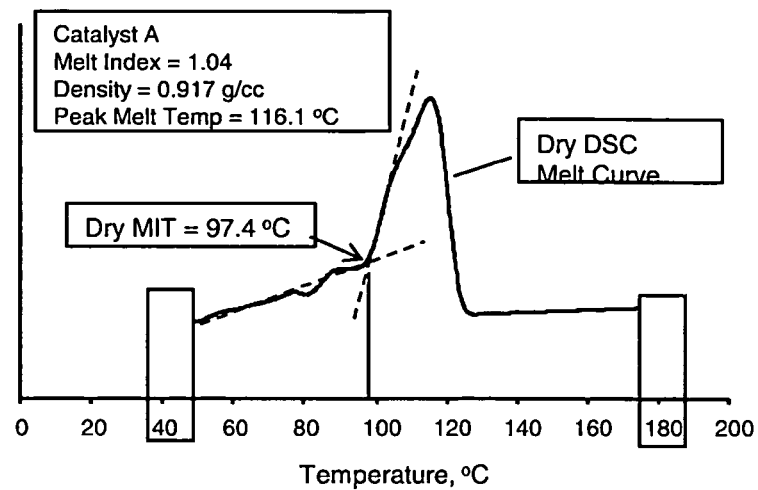
Figure 4 – Displaced MIT ($MIT_R$)
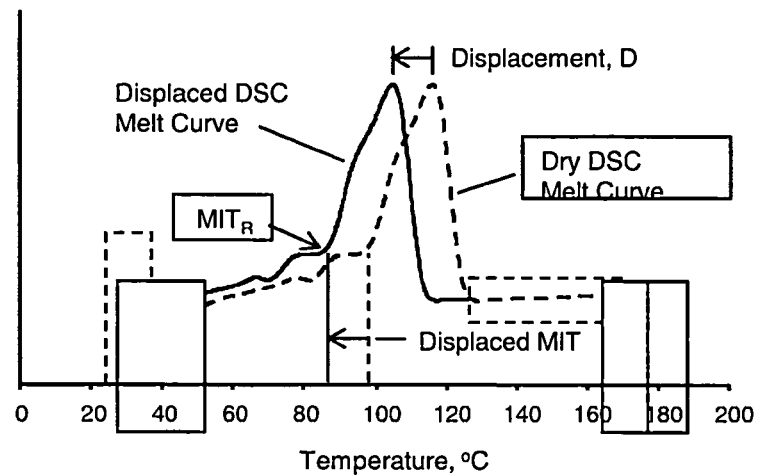

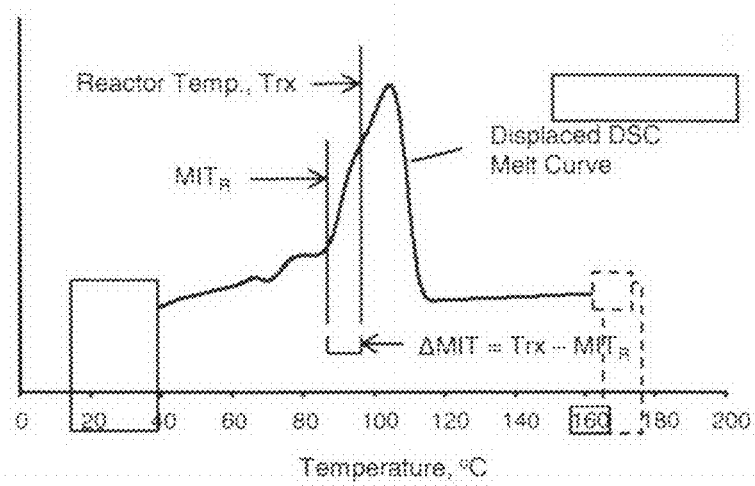
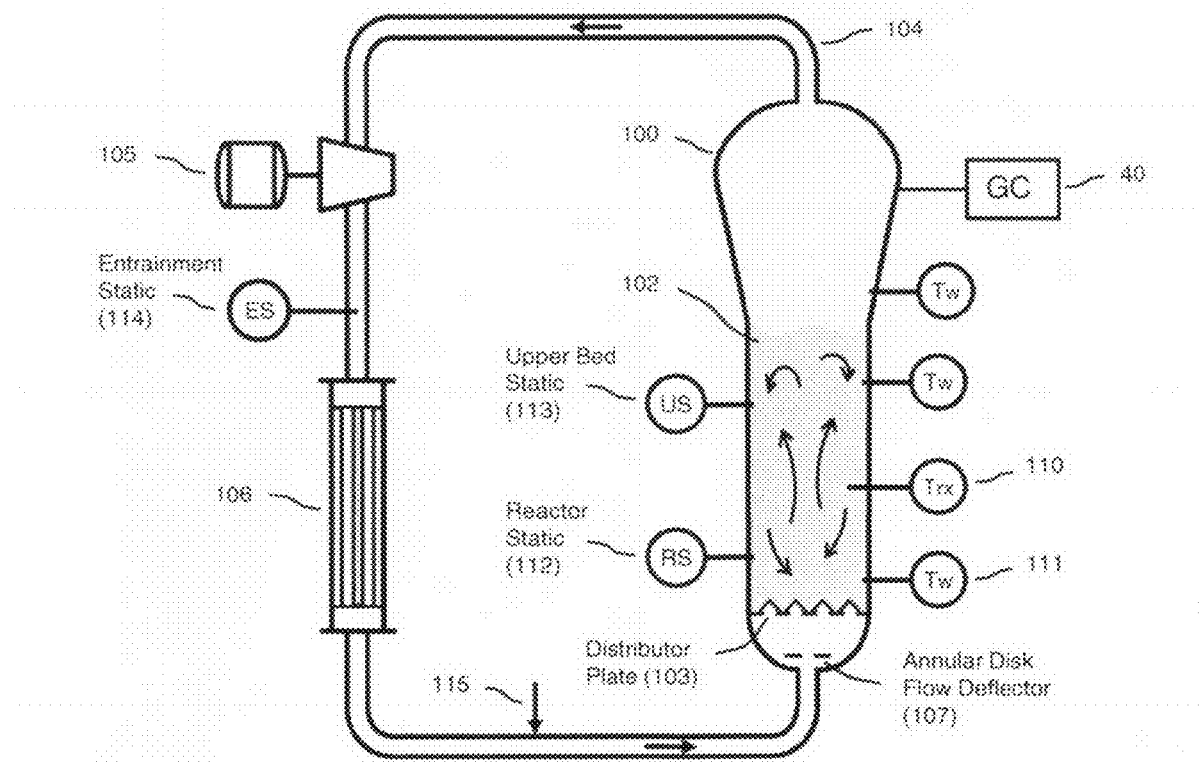

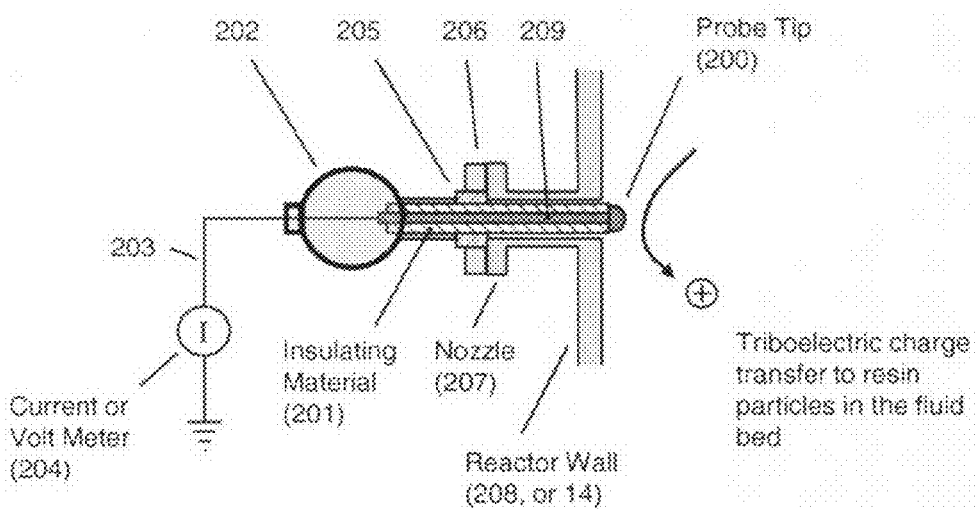
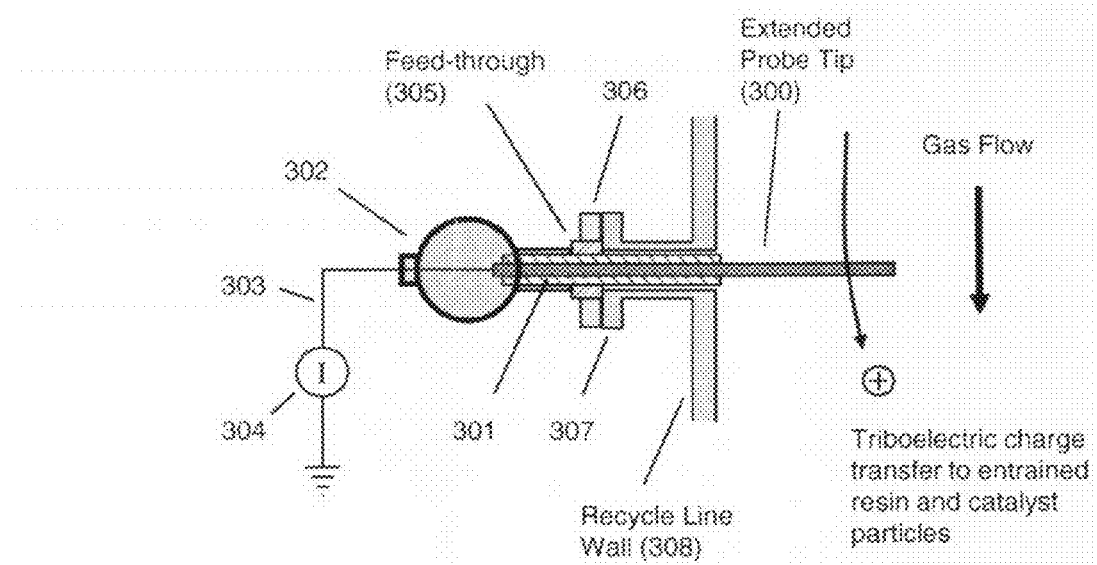

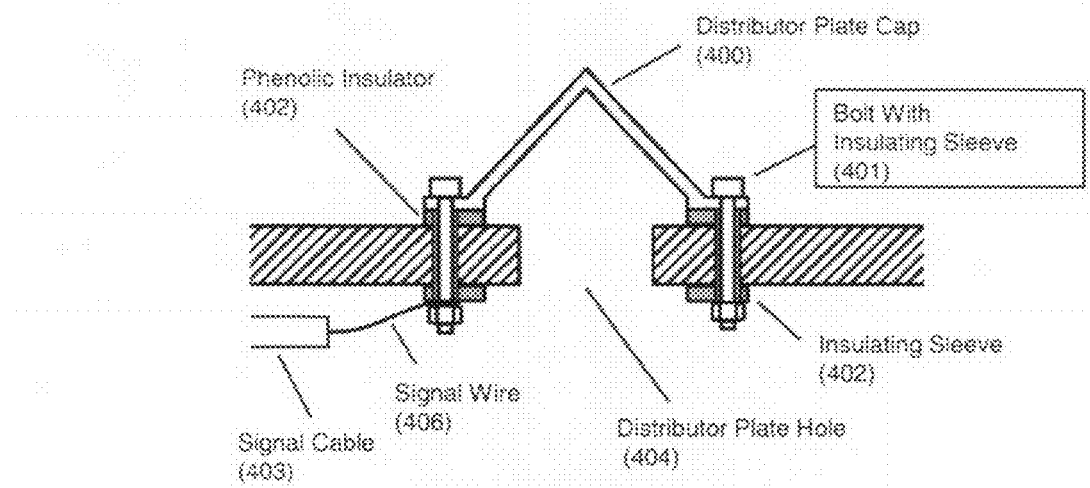
Figure 9 – Distributor Plate Static Probe
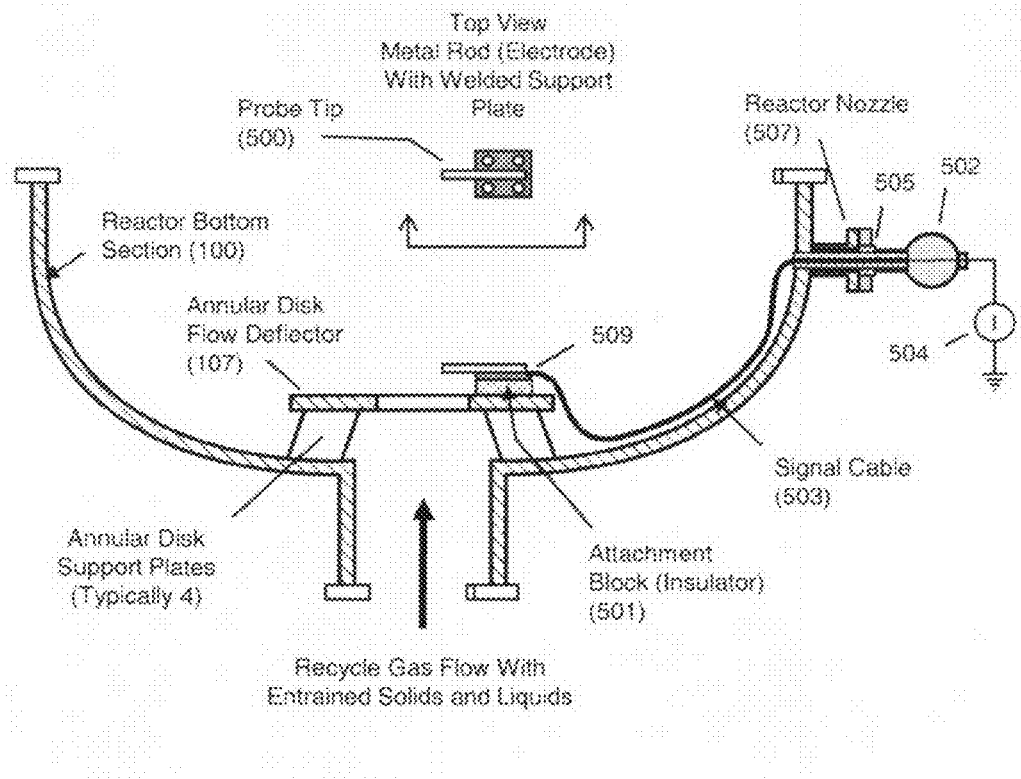
Figure 10 – Annular Disk Static Probe

METHOD FOR ON-LINE MONITORING AND CONTROL OF POLYMERIZATION PROCESSES AND REACTORS TO PREVENT DISCONTINUITY EVENTS

CROSS REFERENCE TO RELATED APPLICATIONS

This application a continuation of PCT/US2008/000732, filed Jan. 18, 2008, which claims the benefit of Ser. No. 60/901,906, filed Feb. 16, 2007, the disclosures of which are incorporated by reference in their entirety.

FIELD OF THE INVENTION

The invention pertains to methods for monitoring a resin-producing polymerization reaction (e.g., an olefin polymerization reaction) in a gas phase fluidized-bed reactor and generating in on-line fashion data indicative of electrostatic activity in the reactor and the degree of resin stickiness (e.g., data indicative of imminent resin stickiness) from monitored reaction parameters, and optionally also controlling the reaction in response to the data (e.g., to prevent occurrence of a reactor sheeting or other discontinuity event). The generated data may be or include bed static data, carryover static data, temperature data, and resin properties data which are typically interpreted in accordance with a predetermined model.

BACKGROUND

The expression "on-line generation" of data during a reaction is used herein to denote generation of the data sufficiently rapidly so that the data is available essentially instantaneously or sometime thereafter for use during the reaction. The expression "generation of data in on-line fashion" during a reaction is used synonymously with the expression on-line generation of data during a reaction. Generation of data from a laboratory test (on at least one substance employed or generated in the reaction) is not considered "on-line generation" of data during the reaction, if the laboratory test consumes so much time that parameters of the reaction may change significantly during the time required to conduct the test. It is contemplated that on-line generation of data may include the use of a previously generated database that may have been generated in any of a variety of ways including time-consuming laboratory tests.

With reference to a product being produced by a continuous reaction, the expression "instantaneous" value of a property of the product herein denotes the value of the property of the most recently produced quantity of the product. Because of the back-mixed nature of a gas phase polymerization reactor, the most recently produced polymer product typically undergoes mixing with previously produced quantities of product before a mixture of the recently and previously produced product exits the reactor. In contrast, with reference to a product being produced by a continuous reaction, the expression "average" (or "bed average") value (at a time "T") of a property herein denotes the value of the property of the product that exits the reactor at time T.

Throughout this disclosure, the expression "diluent" (or "condensable diluent" or "condensable diluent gas") denotes condensable gas (or a mixture of condensable gases) present in a polymerization reactor with polymer resin being produced. The diluent is condensable at the temperatures encountered in the process heat exchanger. Examples of diluents include induced condensing agents ("ICAs"), comonomers, isomers of comonomers, and combinations thereof.

The expression "dry polymer resin" (or "dry version" of polymer resin) is used herein to denote polymer resin that does not contain substantial amounts of dissolved gas. An example of dry polymer resin is polymer that had been previously produced in a polymerization reactor and then purged to eliminate all (or substantially all) unreacted monomers, comonomers and ICAs that had been dissolved in the polymer at the time of production. As will be discussed herein, a dry version of polymer resin has significantly different melting (and sticking) behavior than would the same polymer resin if it were in the presence of a significant amount of condensable diluent gas and comonomer.

The expression "polyethylene" denotes at least one polymer of ethylene and optionally one or more $C_3$-$C_{10}$ α-olefins, while the expression polyolefin denotes at least one polymer (or copolymer) of one or more $C_2$-$C_{10}$ α-olefins.

Throughout this disclosure, the abbreviation "MI" denotes melt index ($I_2$) of the polymer product, measured in accordance with ASTM-D-1238-E unless otherwise stated. Also throughout this disclosure, the term "density" denotes the intrinsic material density of a polymer product (in units of g/cc), measured in accordance with ASTM-D-1505-98 unless otherwise stated.

One method for producing polymers is gas phase polymerization. A conventional gas phase fluidized bed reactor, commonly employs a fluidized dense-phase bed typically including a mixture of reaction gas, polymer (resin) particles, catalyst, and (optionally) other additives. Typically, any of several process control variables will cause the reaction product to have certain, preferably desired, characteristics.

Generally in a gas-phase fluidized bed process for producing polymers from monomers, a gaseous stream containing one or more monomers is continuously passed through a fluidized bed under reactive conditions in the presence of an activated catalyst. This gaseous stream is optionally withdrawn from the top of the fluidized bed and recycled back into the reactor. Simultaneously, polymer product is withdrawn from the reactor and new monomer is added to replace the polymerized monomer. The recycled gas stream is heated in the reactor by the heat of polymerization. This heat is typically removed in another part of the cycle by a cooling system external to the reactor.

It is important to remove heat generated by the reaction in order to maintain the temperature of the resin and gaseous stream inside the reactor at a temperature below the polymer melting point and/or catalyst deactivation temperature. Further, heat removal is important to control the reactor temperature to prevent excessive stickiness of polymer particles that if left unchecked, may result in loss of fluidization or agglomeration of the sticky particles which may lead to formation of chunks or sheets of fused polymer that cannot be removed as product. The production of such chunks or sheets can present significant operational problems in fluidized bed reactor systems because, once formed, the fused chunks or sheets may fall onto the distributor plate causing impaired fluidization and mixing, which in many cases requires a reactor shutdown for cleaning. Prevention of such excessive resin stickiness has been accomplished by controlling the temperature of the fluid bed to a temperature just below the fusion or sintering temperature of the polymer particles. Above this fusion or sintering temperature, empirical evidence suggests that such fusion or sintering leads to agglomeration or stickiness in the polymer product, which can in turn (if left unchecked) lead to the above conditions.

In addition, the amount of polymer produced in a fluidized bed polymerization process is directly related to the amount of heat that can be withdrawn from the fluidized bed reaction zone. In steady state operation of the reaction process, ideally, the rate of heat removal from the fluidized bed must equal the rate of rate of heat generation, such that the bed temperature remains constant. Conventionally, heat has been removed from the fluidized bed by cooling the gas recycle stream in a heat exchanger external to the reactor.

A requirement of a fluidized bed process is that the velocity of the gaseous recycle stream be sufficiently high to maintain the reaction zone in a fluidized state. In a conventional fluidized bed polymerization process, the amount of fluid circulated to remove the heat of polymerization is greater than the amount of fluid required for support of the fluidized bed and for adequate mixing of the solids in the fluidized bed. The excess velocity provides additional gas flow to (and through) the fluid bed for additional cooling capacity and more intensive mixing of the reactor bed. However, to prevent excessive entrainment of solids in a gaseous stream withdrawn from the fluidized bed, the velocity of the gaseous stream must be regulated.

For a time, it was thought that the temperature of the gaseous stream external to the reactor, otherwise known as the recycle stream temperature, could not be decreased below the dew point of the recycle stream without causing problems of polymer agglomeration or plugging of the reactor system. The dew point of the recycle stream is that temperature at which liquid condensate first begins to form in the gaseous recycle stream. The dew point may be calculated knowing the gas composition, and may be thermodynamically defined.

Contrary to this belief, as suggested by Jenkins et al. in U.S. Pat. Nos. 4,543,399 and 4,588,790, a recycle stream can be cooled to a temperature below the dew point in a fluidized bed polymerization process resulting in condensing a portion of the recycle gas stream. The resulting stream containing entrained liquid can be returned to the reactor without causing the aforementioned agglomeration and/or plugging phenomena (which was generally expected prior to Jenkins). The process of purposefully condensing a portion of the recycle stream is known in the industry as "condensed mode" operation in a gas phase polymerization process.

The above-cited U.S. patents to Jenkins et al. suggest that when a recycle stream temperature is lowered to a point below its dew point in "condensed mode" operation, an increase in polymer production is possible, as compared to production in a non-condensing mode because of increased cooling capacity. Consequently, a substantial increase in space-time yield, the polymer production rate per unit of reactor volume, can be achieved by condensed mode operation with little or no change in product properties.

Cooling of the recycle stream to a temperature below the gas dew point temperature produces a two-phase gas/liquid mixture with solids contained in both of these phases. The liquid phase of this two-phase gas/liquid mixture in condensed mode operation remains entrained or suspended in the gas phase portion of the mixture. Vaporization of the liquid occurs only when heat is added or pressure is reduced. In this process, vaporization occurs when the two-phase mixture enters the fluidized bed, with the (warmer) resin providing the required heat of vaporization. The vaporization thus provides an additional means of extracting heat of reaction from the fluidized bed. The heat removal capacity is further enhanced in condensed mode operation by the increased (sensible) heat transfer associated with the lower temperatures of the gas stream entering the fluidized bed. Both of these factors increase the overall heat removal capability of the system and thereby enable higher space-time yields.

Jenkins, et al. illustrate the difficulty and complexity of such condensed mode reaction control in general, and of trying to extend the stable operating zone to optimize the space time yield in a gas phase reactor, especially when operating in condensed mode.

The cooling capacity of recycle gas can be increased further while at a given reaction temperature and a given temperature of the cooling heat transfer medium. One option described is to add non-polymerizing, non-reactive materials to the reactor, which are in the gaseous state in the fluidized bed section of the reactor, but are condensable at the lower temperatures encountered in the process heat exchanger. Such non-reactive, condensable materials are collectively known as induced condensing agents (ICAs) since they "induce" additional condensing in the system. Increasing concentrations of ICA in the reactor causes corresponding increases in the dew point temperature of the reactor gas, which (for a given heat exchanger temperature) promotes higher levels of condensing for higher heat-transfer limited production rates from the reactor. Suitable ICA materials are selected based on their specific heat and boiling point properties. In particular, ICA compounds are selected such that a relatively high portion of the material is condensed at the cooling water temperatures available in polymer production plants, which are typically 20-40° C. ICA materials include hexane, isohexane, pentane, isopentane, butane, isobutane and other hydrocarbon compounds that are similarly non-reactive in the polymerization process.

U.S. Pat. No. 5,352,749, teaches, among other things, that there are limits to the concentrations of condensable gases, whether ICA materials, comonomers or combinations thereof, that can be tolerated in the reaction system. Above certain limiting concentrations, the condensable gases can cause a sudden loss of fluidization in the reactor, and a consequent loss in ability to control the temperature in the fluid bed. U.S. Pat. Nos. 5,352,749, 5,405,922 and 5,436,304, suggest upper limits of ICA in the reactor, depending on the type of polymer being produced. The authors characterized the upper limit of condensable materials by tracking the ratio of fluidized bulk density to settled bulk density. As the concentration of isopentane (ICA) was increased in an otherwise steady-state reaction, they found that the bulk density ratio steadily decreased. When the concentration of isopentane was sufficiently high, corresponding to a bulk density ratio of 0.59, they found that fluidization in the reactor was lost. They, therefore, determined that this ratio (0.59) represented a limiting value below which a reactor would cease functioning due to loss of fluidization.

As described in U.S. Pat. No. 7,122,607, attempts to operate polymerization reactors with excessive ICA concentrations cause polymer particles suspended in the fluid bed to become cohesive or "sticky," and in some cases cause the fluid bed to solidify in the form of a large chunk. This stickiness problem is characterized by undesirable changes in fluidization and mixing in the fluid bed, which if left unchecked, may develop into a reactor discontinuity event, such as sheeting or chunking. Chunks are solid masses of polymer that can form within the interior of the fluidized bed. Sheets are solid masses of polymer that can form on the interior reactor walls. The sheets eventually become dislodged from the walls and fall into the reaction section. These solid masses of polymer (sheets or chunks) may settle on the distributor plate, where they interfere with fluidization, block the product discharge port, and usually force a reactor shut-down for cleaning. The lost production associated with such forced reactor shut-downs can have significant economic impact in large-scale, commercial production plants.

There are at least two distinct types of sheets that can be formed in gas phase reactors: wall sheets or dome sheets, depending on where they are formed in the reactor. Wall sheets are formed on the walls (generally vertical walls) of the reaction section. Dome sheets are formed higher in the reactor, on the conical section of the dome, or on the hemispherical head on the top of the reactor.

When sheeting occurs with Ziegler-Natta catalysts, it is generally wall sheeting in the lower portion of the reaction section. Ziegler-Natta catalysts are capable of forming dome sheets, but the occurrence is rare. With metallocene catalysts, however, sheeting can occur in either or both locations (i.e. both wall sheeting and dome sheeting can occur). Dome sheeting has been particularly troublesome with metallocene catalyst systems.

The term "discontinuity event" is used to describe a forced disruption in the continuous operation of a polymerization reactor caused by, e.g., wall or dome sheeting, chunking or fouling of the gas recycle system. The terms "sheeting and/or chunking" while used synonymously herein, may describe different manifestations of problems discussed herein. In either manifestation (sheeting or chucking), the excessive polymer stickiness may lead directly to a reactor discontinuity event with the associated loss production.

Throughout this disclosure, the terms "fusion temperature," "sintering temperature," and "sticking temperature" are used synonymously to denote the temperature at which the polymer in the reactor (in the presence of reaction and diluent gases) reaches conditions of limiting stickiness, which can lead to the discontinuity events described above.

Two articles by Process Analysis & Automation Limited (PAA), entitled "Agglomeration Detection by Acoustic Emission," PAA Application note: 2002/111 (2000) and "Acoustic Emission Technology—a New Sensing Technique for Optimising Polyolefin Production" (2000), suggest process control in fluidized bed production of polyolefins utilizing acoustic emission sensors located at various positions on the reactor and recycle piping. These publications purport to solve the problem of detecting the presence of large polymer agglomerates in a reactor, such as chunks or sheets, rather than detecting stickiness of the resin particles. One specific example is provided showing the detection of a chunk of approximately 1.5 meters in diameter within a commercial fluid bed reactor.

WO 03/051929 describes the use of mathematical chaos theory to detect the onset and presence of sheeting in a fluid bed reactor. Signals from a range of instruments, including acoustic emission sensors, differential pressure sensors, static sensors, and wall temperature sensors are filtered by certain specified methods to construct a "time-series" of data, which is then processed by methods of non-linear dynamics (herein referred to as chaos theory) and compared to data from a control reactor running without sheeting. The onset of sheeting is indicated by an increase in mean "cycle time" (relative to a baseline, control reactor), usually with a concurrent decrease in the "mean deviation" of the time-series. Alternatively, the onset of sheeting is indicated by a decrease in the mathematical "entropy" of the time-series data, as compared to a similar reactor running without sheeting. (The terms "time-series," "cycle time," "mean deviation," and "entropy" here refer to calculated parameters defined by chaos theory).

Adding to the complexity of control of stickiness while using ICAs, different polymer products vary widely in their ability to tolerate ICA materials, some having a relatively high tolerance (expressed in partial pressure of the ICA in the reactor). For example, some polymers can tolerate as much as 50 psia of ICA, while other polymers can tolerate only 5 psia or less. With these latter polymers, the heat-transfer limited production rates under similar conditions are substantially lower. Polymers which possess a more uniform comonomer composition distribution are known to have a higher tolerance to the partial pressure of the ICA in the reactor. Metallocene catalyst produced polymers are a good example of polymers with such a more uniform comonomer composition. However, at some point even these metallocene produced polymers reach a limiting ICA concentration that induces stickiness. The limiting ICA concentration depends on several factors in addition to the polymer type, including reactor temperature, comonomer type and concentration, etc. Further, with the effect of temperature, ICA level and comonomer levels all affecting on the onset of stickiness, determining the point at which sticking begins to occur has heretofore been difficult.

Even within the constraints of conventional, safe operation, control of such reactors is complex adding further to the difficulty and uncertainty of experimentation if one wishes to find new and improved operating conditions that might result in higher production rates. Discontinuity events at large-scale, gas phase polymer production plants are expensive. Further, risks associated with experimentation in such plants are high due to the high cost of reactor downtime. Therefore, it is difficult to explore design and operating boundaries experimentally in view of the costs and risks involved.

It would be desirable to provide a method of determining a stable operating condition for gas fluidized bed polymerization, especially if operating in condensed mode, to facilitate optimum design of the plant and the determination of desirable process conditions for optimum or maximum production rates in a given plant design.

It would also be desirable to have a mechanism in commercial gas-phase reactors to detect the onset of stickiness (in on-line fashion) that is a better or an earlier indicator of the onset of stickiness than are conventional techniques (e.g., monitoring the fluidized bulk density as described in U.S. Pat. No. 5,352,749). Such a mechanism would allow the operators to determine when conditions of limiting stickiness were being approached, and enable them to take corrective action before discontinuity events (such as sheeting and chunking) occurred, while keeping the reactors at or near conditions of maximum ICA concentration, permitting higher production rates with substantially less risk.

WO 2005/113615 and corresponding U.S. Pat. No. 7,122,607 describe the determination of a critical temperature below which resin in a polymerization reactor cannot become sticky, and use of this predetermined critical temperature to control the reactor. These references define "dry sticking temperature" of a polymer to be produced in a fluidized bed reactor as the temperature at which agglomeration within the bed or fouling on any surface of the reactor vessel begins to occur with the reactor operating at normal pressure and gas velocity but in the presence of substantially pure nitrogen, rather than the normal gas components. They define a liquid "melting point depression" as the temperature by which the melting point of the polymer in the reactor is depressed by liquid immersion of the polymer in the hydrocarbons (ICA and comonomer) to be used in the process. Because the measurements are carried out in the presence of the liquid hydrocarbons (rather than gases), the resulting "melting point depression" represents the maximum amount by which the melting point can be depressed in a reactor operating in the gas phase with the same hydrocarbon materials. The references also describe a method including the steps of determining the dry sticking temperature of a polymer to be produced; determining the melting point depression for the reaction; and then operating the gas phase reactor process with a bed temperature below a "critical temperature" defined as the dry sticking temperature minus the liquid melting point depression. The references teach that performing the reaction with the bed temperature below the critical temperature can eliminate stickiness induced in the resin due to high concentrations of condensables.

U.S. patent application Ser. No. 11/227,710, discloses on-line monitoring of resin stickiness in a polymerization reactor by generating a time series of acoustic emissions readings generated by the contents of the reactor. Acoustic emission measurements are first generated during steady state operation of a reactor (producing the relevant polymer). Additional acoustic emission measurements (generated during non-steady state operation of the reactor) are then processed to determine whether they deviate from acoustic emissions indicative of steady state reactor operation. Such deviation is treated as an indication of onset of excessive stickiness of polymer particles in the reactor. Corrective action can be taken (e.g., reductions in ICA and/or monomer concentrations and/or a reduction in reactor temperature) when the acoustic emission measurements are determined to deviate (negatively) beyond three standard deviations of those of a steady state reactor.

U.S. Patent Application Nos. 60/842,747 ("MRT application") and 60/842,719 ("MIT application"), both filed on Sep. 7, 2006, describe methods for detecting conditions indicative of imminent occurrence of sheeting during polymerization reactions in fluid bed polymerization reactors, and preferably also controlling the reactions to prevent the occurrence of sheeting.

The MRT application describes a method including of the steps of: monitoring a polymerization reaction which produces a polymer resin in a fluid bed reactor, wherein a dry melt reference temperature is determined that is characteristic of melting behavior of a dry version of the polymer resin; and in response to data indicative of at least one monitored parameter of the reaction, determining, in on-line fashion, a reduced melt reference temperature characteristic of the melting behavior of the polymer resin as it exists in the reactor. The reduced melt reference temperature ($MRT_R$) is at least substantially equal to the difference between the dry melt reference temperature and a melt reference temperature depression value, "D," where D is a temperature by which the dry melt reference temperature is depressed by the presence of diluent that is present with the resin in the reactor. The method optionally also includes the steps of determining a stickiness control parameter from the reduced melt reference temperature, and controlling the reaction in response to the stickiness control parameter.

The MIT application describes a specific method of applying the MRT method, and includes of the steps of:

(a) during a polymerization reaction in a fluid bed reactor which produces a polymer resin, measuring parameters of the reaction including at least reactor temperature, at least one resin property of the polymer resin, and concentration of at least one condensable diluent gas in the reactor;

(b) determining from the at least one resin property, using a predetermined correlation, a dry melt initiation temperature of a dry version of the polymer resin; and (c) during the reaction, using a melt initiation temperature depression model to determine, in on-line fashion from at least some of the parameters measured in step (a) and the dry melt initiation temperature value, a reduced melt initiation temperature for the polymer resin in the presence of the at least one condensable diluent gas, said melt initiation temperature depression model identifying an estimated degree of depression of the dry melt initiation temperature due to presence of at least one diluent with the polymer resin. In typical embodiments, the melt initiation temperature depression model implements the well-known Flory melt depression equation; and optionally also the step of:

(d) determining in on-line fashion a temperature value indicative of resin stickiness in the reactor, from the reduced melt initiation temperature determined in step (c) and a current value of the reactor temperature. Typically, the temperature value generated in step (d) is a temperature value $\Delta MIT$ that is at least substantially equal to $Trx - MIT_R$, where Trx is the current value of reactor temperature, and $MIT_R$ is the reduced melt initiation temperature determined in step (c). The temperature value indicative of resin stickiness determined in this manner ($\Delta MIT$) may be used in the present inventive method as a parameter to control resin stickiness in the fluidized bed.

The MIT and MRT applications also disclose methods and systems for on-line generation of data indicative of imminent occurrence of limiting resin stickiness in the fluidized bed, which if left unchecked, could lead to sheeting or other discontinuity events in the reactor. The present invention pertains to, inter alia, a reaction monitoring system that incorporates these methods for monitoring resin stickiness together with methods for monitoring other reaction parameters such as bed static and carryover static. This combination of data provides for an improved, on-line prediction of the imminent occurrence of sheeting in a fluidized bed polymerization reaction system.

The expressions "bed static" and "reactor static" are used synonymously in the present disclosure to denote the static charge that is generated by frictional contact between the resin and the reactor walls in the fluidized bed section of the reactor. Static probes suitable for measuring the bed static are described in, for example, U.S. Pat. No. 6,008,662, and further described in the present disclosure.

Above-cited related U.S. Patent Application Publication No. 2005/0148742 describes use of static probes positioned in the "entrainment zone" of a fluidized bed polymerization reaction system to monitor "carryover static." This reference also describes control of the reaction in response to the results of such carryover static monitoring to prevent discontinuity events such as chunking and sheeting (e.g., to reduce carryover static and thereby prevent such discontinuity events).

The expression "entrainment zone" of a fluidized bed reactor system is used in US Patent Application Publication No. 2005/0148742 and the present disclosure to denote any location in the reactor system outside the dense phase zone of the system (i.e., outside the fluidized bed).

The expression "carryover static" is used in U.S. Patent Application Publication No. 2005/0148742 and the present disclosure to denote the static charging that results from frictional contact by particles (e.g., catalyst particles and resin particles) against the metal walls of the gas recycle line, or against other metal components in the reactor entrainment zone. Carryover static can be measured by suitable static probes positioned in various sections of the entrainment zone of the reaction system, including the expanded (disengagement) section, the recycle line, and the distributor plate.

In the present disclosure, the expression "entrainment static" denotes carryover static that results from frictional contact between entrained particles and a static probe located in a gas recycle line of a fluidized bed reactor system. Thus, the term "entrainment static" represents a specific means of measuring the carryover static generated by frictional contact of entrained particles that occur throughout the gas recycle system.

U.S. Pat. No. 4,532,311 describes, inter alia, the use of "skin" temperature sensors, which are configured and positioned to sense the temperature $T_w$ of the resin and/or reactor gas near the wall of the reactor during operation. The skin temperature sensors are typically implemented as thermocouple sensors mounted in positions along straight section of the reactor wall so as to protrude a short distance into the reactor (e.g., 3 to 12 mm). These sensors are capable of detecting the formation of a fused polymer sheet at a specific location on the wall, as indicated by an increased "skin" temperature reading of typically 3 to 20° C. above their normal, steady state reading. However, the utility of these sensors is limited because they can detect only those sheets that form in the specific location of a sensor, and because they are coincident indicators. They provide an indication that a sheet is currently forming (at that location) but cannot provide early warning of an impending sheeting event. Skin temperature sensors may also be implemented near the walls of the reactor expanded section, preferably 0.1 to 1.0 reactor diameters above the operating level of the fluidized bed (as illustrated in FIG. 6). In this location, the skin temperature sensors are capable of detecting (at least in some cases) the occurrence of dome sheeting in the lower portion of the expanded section.

Other background references include WO 86/07065, WO 99/02573, WO 02/30993, WO 2006/107437, and U.S. Patent Application Publication No. 2006/130870.

It would therefore be desirable to define a system capable of providing an early indication of impending sheeting or other discontinuity event in a gas phase, fluidized bed reactor that would provide sufficient advanced warning to enable the operators to make changes in the process to avoid the associated discontinuity event. Preferably, such an "early warning" or "continuity monitoring" system would be based on real-time measurements (i.e. monitoring) of the fundamental process parameters that cause wall and dome sheeting with metallocene catalysts.

SUMMARY

The present invention is based on at least two discoveries by the inventors regarding the mechanisms of wall and dome sheeting with, for example, metallocene catalysts in fluidized bed polymerization reactors:

two separate mechanisms cause dome and wall sheeting during such polymerization. One mechanism is controlled by the process parameter of static (e.g., one or both of carryover static and reactor ("bed") static); the other by the process parameter of resin stickiness. For example, the inventors have recognized that dome sheeting may result from excessive values of either carryover static or resin stickiness, or combinations of the two; and during such polymerization in the presence of at least one metallocene catalyst, wall sheeting often occurs when the reactor static ("bed" static) in the fluidized bed becomes negative.

Preferred embodiments of the inventive method monitor a polymer resin-producing polymerization reaction in a fluid bed reactor to generate, in on-line fashion, data indicative of the imminent occurrence of a discontinuity event (e.g., sheeting). Preferably also, the reaction is controlled in an effort to prevent the occurrence of the discontinuity event. These embodiments provide early warning of discontinuity events using measured data (preferably generated in on-line fashion using a combination of instruments) and parameters calculated in on-line fashion (e.g., a temperature value indicative of resin stickiness in the reactor, and/or other parameters related to resin sticking temperature or imminence of resin stickiness).

In a class of embodiments, the inventive method includes the steps of:

(a) generating in on-line fashion at least one of bed static data indicative of static charge in the fluidized bed (such static charge is sometimes referred to herein as reactor or "bed" static charge) and carryover static data indicative of carryover static (e.g., entrainment static); and (b) generating at least one of temperature data indicative of a first temperature, and acoustic emission data indicative of resin stickiness in the reactor (e.g., acoustic emission data indicating whether resin in the fluid bed is approaching a sticky condition, or whether such a sticky condition is imminent), in on-line fashion. The temperature data are generated using at least one monitored reaction parameter, so that said first temperature is indicative of at least one of degree of resin stickiness in the reactor and a characteristic of melting behavior of polymer resin in the reactor in the presence of at least one diluent. In some embodiments, the first temperature is $MRT_R$ as defined above or $\Delta MRT = Trx - MIT_R$, where Trx is the current value of reactor temperature. In some other embodiments, the first temperature is $MIT_R$ or $\Delta MIT$, also defined above. Examples of acoustic emission that may be suitable to monitor the reaction to generate the acoustic emission data are those described in U.S. patent application Ser. No. 11/227,710, filed Sep. 14, 2005, that generate a time series of readings of acoustic emissions of contents of the reactor. In some embodiments, the method also includes the step of generating in on-line fashion skin temperature data using at least one skin temperature sensor (preferably at least one thermocouple sensor having fast response design). Preferably, if and when a sheeting event or other discontinuity event is occurring in the reactor, the skin temperature data provide a coincident indication of the sheeting event or other discontinuity event.

In typical embodiments in which carryover static data are generated, the carryover static data are generated using at least one static probe positioned to monitor static charge outside the fluidized bed (i.e., in the entrainment zone). Typically, the reactor has a gas recycle line and the carryover static data are entrainment static data, generated using at least one entrainment static probe positioned to monitor static charge in the gas recycle line. Static probes suitable for generating carryover static (e.g., entrainment static) data in many embodiments of the invention are described in above-referenced U.S. Patent Application Publication No. 2005/0148742. Static probes suitable for generating carryover static data in some embodiments of the invention are static current probes; others are static voltage probes. Alternatively, the carryover static data are generated by other instruments (e.g., using a Faraday cup to measure static charge of samples of entrained material collected from the recycle line with an isokinetic or other sampler).

In typical embodiments in which bed static data are generated, the bed static data are generated using at least one static probe (e.g., a static probe of the type described in U.S. Pat. Nos. 4,532,311, 5,648,581, 6,008,662, or another conventional reactor static probe) positioned to monitor static charge in the reactor at or near a portion of the reactor wall that bounds the fluidized bed. The inventors have recognized that during polymerization in the presence of a metallocene catalyst (e.g., a metallocene catalyst system), wall sheeting can occur when bed static charge becomes negative. This is surprising in view of prior art teachings that high positive values of reactor static lead to wall sheeting during polymerization in the presence of Ziegler-Natta catalysts.

In a class of preferred embodiments, step (b) includes the steps of: (i) during the reaction, monitoring reaction parameters including at least reactor temperature, at least one resin property of the polymer resin (such as resin density), and concentration of at least one condensable diluent gas in the reactor; (ii) determining from the at least one resin property, using a predetermined correlation between resin melting temperature and said at least one resin property, a dry melt initiation temperature of a dry version of the polymer resin; (iii) during the reaction, using a melt initiation temperature depression model to determine, in on-line fashion from at least some of the parameters monitored in step (i) and the dry melt initiation temperature, a reduced melt initiation temperature for the polymer resin in the presence of the at least one condensable diluent gas; said melt initiation temperature depression model identifying an estimated degree of depression of the dry melt initiation temperature due to presence of at least one diluent with the polymer resin; and (iv) determining a stickiness monitoring and control parameter in on-line fashion from the reduced melt initiation temperature determined in step (iii) and a current value of the reactor temperature. In typical embodiments, the melt initiation temperature depression model implements the well-known Flory melt depression equation. In some embodiments, the stickiness monitoring parameter is a value $\Delta$MIT that is at least substantially equal to $\text{Trx}-\text{MIT}_R$, where Trx is the current value of reactor temperature, and $\text{MIT}_R$ is the reduced melt initiation temperature determined in step (iii). The stickiness monitoring and control parameter ($\Delta$MIT) determined in this fashion is used to quantify (and monitor) the degree of resin stickiness in the fluidized bed.

In some embodiments, step (b) includes the step of generating temperature data indicative of a first temperature, in on-line fashion using at least one monitored reaction parameter, where the first temperature is indicative of at least one of degree of resin stickiness in the reactor and a characteristic of melting behavior of a polymer resin in the reactor in the presence of at least one diluent, and the inventive method also includes the steps of:

(c) generating in on-line fashion reaction parameter data indicative of resin stickiness (e.g., reaction parameter data indicating whether resin in the fluid bed is approaching a sticky condition, or whether such a sticky condition is imminent), where the reaction parameter data is neither carryover static data nor bed static data. At least one instrument is typically used to monitor the reaction to generate the reaction parameter data. Examples of instruments that may be suitable for this purpose are acoustic emission sensors (e.g., those described in U.S. patent application Ser. No. 11/227,710, filed Sep. 14, 2005, that generate a time series of readings of acoustic emissions of contents of the reactor, temperature sensors, and differential pressure sensors.)

In some embodiments, the method also includes the step of controlling the reaction in response to the data generated in steps (a) and (b) (as well as step (c) if this step is performed), typically in an effort to prevent (and preferably to prevent) the occurrence of sheeting or another discontinuity events. For example, in response to entrainment static data generated in step (a) indicating excessive carryover static, the reaction can be controlled in an effort to prevent dome sheeting. (In this case a typical response could include a reduction in the superficial velocity of fluidizing gas.) For another example, in response to bed static data generated in step (a) (during polymerization in the presence of a metallocene catalyst) indicating negative static charge in the fluidized bed, the reaction can be controlled in an effort to prevent wall sheeting (e.g., by the addition of additives to reduce the static). For another example, in response to reaction parameter data, generated during step (c) or temperature data generated in step (b), which is indicative of an approach to conditions of excessive stickiness in the fluidized bed, the reaction can be controlled to maintain the reactor in a stable, non-sticking condition.

Because excessive bed static, carryover static or resin stickiness, either individually or in combination, can be indicative of imminent sheeting and other discontinuity events during resin-producing polymerization reactions in fluid bed reactors, preferred embodiments of the inventive method not only generate bed static data and carryover static data in step (a), but also include calculation of a stickiness monitoring parameter in step (b) and optionally the acoustic measurements in step (c), to predict imminent occurrence of discontinuity events (e.g., sheeting).

In some embodiments, step (b) includes the steps of monitoring the reaction to generate data indicative of at least one monitored reaction parameter, and in response to the data, generating in on-line fashion temperature data indicative of a reduced melt reference temperature characteristic of the melting behavior of polymer resin as it exists in the reactor. The reduced melt reference temperature is at least substantially equal to the difference between a "dry melt reference" temperature (characteristic of melting behavior of a dry version of the polymer resin) and a melt reference temperature depression value, "D," where D is a temperature by which the dry melt reference temperature is depressed by the presence of diluent gases present with the resin in the reactor. The method optionally also includes the step of determining a stickiness monitoring and control parameter $\Delta$MRT from the reduced melt reference temperature, and optionally also the additional step of controlling the reaction in response to the stickiness control parameter and in response to static data generated in step (a), preferably to prevent the occurrence of sheeting or another discontinuity event.

In a class of embodiments, the inventive method includes the step of monitoring concentration of at least one condensable diluent (e.g., at least one induced condensing agent (ICA), at least one comonomer, at least one isomer of a comonomer, and/or a combination of two or more of such diluents) present in the reactor with polymer resin being produced. For example, the method can use a conventional process gas chromatography to determine the gas phase concentrations of the diluents. The method can also use a "virtual analyzer" to monitor (in on-line fashion) concentration of at least one diluent gas present in the reactor with the polymer resin being produced. The virtual analyzer typically implements unsteady-state mass balance calculations based on data indicative of the feed rates of comonomer and ICA to the reactor and their rates of loss from the reactor, to provide estimates of the gas phase concentrations of both components (e.g., to provide a back-up to a process gas chromatograph or other "real" process analyzers in use). Use of a virtual analyzer would typically be especially important during reactor start-ups and transitions with metallocene catalysts, since during these operations, gas phase concentrations of comonomer and ICA (e.g., hexene and isopentane) can change rapidly with time, in some cases faster than the response time of typical process gas chromatographs. In response to the output of the described virtual analyzer, reaction control could be performed to prevent undesired excursions in diluent concentration (e.g., excursions to high comonomer concentrations) that could lead to resin stickiness and/or dome sheeting.

In some embodiments, the inventive method includes the step of generating at least one other calculated parameter in response to at least one monitored reaction parameter. Examples of such calculated parameters include "wall delta temperature" values, which are calculated from measured skin temperatures (i.e., measured temperatures at or near the reactor wall) by subtracting a calculated dew point temperature of gas in the reactor from each measured skin temperature. In some embodiments, the dew point temperature of gas in the reactor is calculated conventionally from measured gas phase concentrations, and is subtracted from measured skin temperatures to generate wall delta temperature values. Skin temperatures can be measured at several locations within the reaction system (including the reaction zone or entrainment zone) using skin thermocouples (e.g., conventional skin thermocouples). In some embodiments, the approach of at least one wall delta temperature value to zero is considered to be an indication that the dew point temperature is approaching the skin temperature at the relevant reactor wall location (and thus that condensation on the wall is likely to occur in such a manner that the condensation will likely trap catalyst and resin fines and cause wall or dome sheeting). Reaction control can be performed in response to determination of such an approach to zero of at least one wall delta temperature value, so as to prevent the occurrence of wall or dome sheeting. Such control action might include, for example, lowering the reaction temperature in the fluidized bed or reducing the concentration of comonomer, ICA, or other condensable gases in the system to reduce the dew point temperature.

In some embodiments, at least one high speed skin thermocouple is used to generate reaction parameter data during step (c) or to determine at least one said monitored reaction parameter employed during step (b). A high speed thermocouple can sense reactor temperature excursions of shorter duration than can a conventional thermocouple. Detection of such short duration temperature excursions can be useful in generating parameter data during step (c) or to determine at least one monitored reaction parameter during step (b).

In a class of preferred embodiments, relevant measured data from all reaction monitoring instruments, and relevant calculated parameters, are combined into an integrated computer display for presentation to users (e.g., plant operators). Such a computer display can be supplemented by process alarms or advisory notices to warn the users of conditions in the process that may be approaching those that will lead to sheeting (e.g., wall or dome sheeting) or other discontinuity events. The alarms or advisory notices can also be combined with recommended control actions to avoid the discontinuity event. For example, in response to the approach of a calculated stickiness monitoring and control value ΔMIT (of the type described above) to a critical range (e.g., 6 to 8° C.), an advisory could be generated with a recommendation to reduce the reactor temperature and/or isopentane concentration to avoid excessive resin stickiness and the resulting dome sheeting.

BRIEF DESCRIPTION OF THE DRAWINGS

FIG. 1 is a simplified cross-sectional view of a reaction system, including fluidized bed reactor 10, whose operation can be monitored and optionally also controlled in accordance with the invention.

FIG. 2 is a block diagram of some elements of the system of FIG. 1 (or FIG. 6) and additional elements for implementing a process for calculating the control variables $MIT_R$ and $\Delta MIT$. These parameters may be calculated using on-line data from the reaction system and used to provide a real-time estimate of the degree of resin stickiness in the fluidized bed.

FIG. 3 is a first melt Differential Scanning Calorimeter (DSC) melting curve generated from measured data for the polymer and catalyst listed in Row 6 of Table 1. (The term "first melt" refers to DSC melting data obtained on a sample that has not previously been melted, as further described below.) A dry MIT value of 97.4° C. was determined from the initial inflection point of the DSC curve as shown in the figure.

FIG. 4 is the DSC curve of FIG. 3 and another first melt DSC curve that shows the effect of dissolved hydrocarbons in displacing (or "depressing") the DSC melting curve of FIG. 3 to lower values of temperature. The dissolved hydrocarbons also produce a reduction of the MIT to a lower value, denoted as $MIT_R$ as shown. The shift (or displacement) of MIT values (D) is computed using the Flory melt depression equation.

FIG. 5 is a displaced first melt DSC curve with indications that illustrate a calculation of the control variable $\Delta MIT$ as the difference between the reactor temperature (Trx) and the shifted (or displaced) value of the melt initiation temperature $MIT_R$.

FIG. 6 is a block diagram of a reaction system, including fluidized bed reactor 100, whose operation can be monitored and optionally also controlled in accordance with the invention.

FIG. 7 is a side cross-sectional view of a reactor static probe of a type used in some embodiments of the present invention.

FIG. 8 is a side cross-sectional view of an entrainment static probe (i.e. a carryover static probe located in the recycle line) of a type used in some embodiments of the present invention.

FIG. 9 is a side cross-sectional view of a distributor plate static probe (another type of carryover static probe mounted on distributor plate 103 of the FIG. 6 system) used in some embodiments of the present invention.

FIG. 10 is a side cross-sectional view of an annular disk static probe (another type of carryover static probe mounted on annular disk 107 of the FIG. 6 system) used in some embodiments of the present invention.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

For the sake of brevity, the definitions and/or other information provided in the BACKGROUND will not be repeated but are hereby incorporated into the DETAILED DESCRIPTION where applicable.

A reactor system whose operation may be monitored and optionally also controlled in accordance with the invention will be described, for example, with reference to FIG. 1. The FIG. 1 system includes fluidized bed reactor 10. Reactor 10 has a bottom end 11, a top expanded (or "dome") section 19

(which is composed of a cylindrical transition section and a hemispherical top head of the reactor), a cylindrical (straight) section 14 between a bottom section 11 and expanded section 19, and a distributor plate 12 within section 14. A fluidized bed 5 of granular polymer and catalyst particles is contained within the straight section 14. The bed is fluidized by a steady flow of recycle gas through the distributor plate 12. The flow rate of fluidizing gas is regulated to provide the fluidized bed with relatively good mixing, as illustrated in the figure.

The reactor system also has a catalyst feeder 9 for controlled addition of polymerization catalyst to the fluidized bed reaction zone. Within the reaction zone (i.e. the fluidized bed), the catalyst particles react with the ethylene, comonomer, and optionally hydrogen and other reaction gases to produce granular polymer particles. As new polymer particles are produced, other polymer particles are continually withdrawn from the fluidized bed through a product discharge system 20. After passing through the product discharge system, the polymer granules are degassed (or "purged") with a flow of inert nitrogen to remove substantially all of the dissolved hydrocarbon materials.

The reactor system of FIG. 1 also has a cooling control loop which includes a recycle gas line 31, a cycle gas cooler 30 and compressor 32, coupled with reactor 10 as shown. During operation, the cooled circulating gas from cooler 30 (which may contain condensed liquid) flows through inlet 34 into reactor 10, then propagates upward through the bed and out from reactor 10 via outlet 33. The cooler 30 is preferably positioned downstream of compressor 32 (as shown in FIG. 1), but in some embodiments may be positioned upstream of compressor 32.

The expanded section 19 is also known as the "velocity reduction zone" or "disengagement zone", and is designed to minimize the quantities of particle entrainment from the fluidized bed. The diameter of each horizontal cross-section of the expanded section 19 is greater than the diameter of straight section 14. The increased diameter causes a reduction in the speed of the fluidizing gas, which allows most of the entrained resin particles to settle back into the fluidized bed, thereby minimizing the quantities of solid particles that are entrained (or "carried over") from the fluidized bed (at a given value of fluidizing gas velocity) through the recycle gas line 31.

One or more bed temperature sensors 16 are located in the fluidized bed, and are used with a control system (not shown in FIG. 1 but which can include processor 50 of FIG. 2) and an external cooling loop coupled to the heat exchanger 30 to control the fluidized bed temperature Trx near the process set-point. Relatively warm reactor gas (which obtains a temperature substantially equal to that of the fluidized bed during its flow through reactor 10) is withdrawn from outlet 33 and is pumped by compressor 32 to cooler 30, wherein the temperature of the gas (the cooling fluid) is reduced. Relatively cool fluid (which may contain condensed liquid) flows out from cooler 30 to the reactor inlet 34, to cool the fluidized bed. Temperature sensors (not shown) near the inlet and outlet of cooler 30 provide feedback to the control system regulate the amount by which cooler 30 reduces the temperature of the fluid entering reactor.

The FIG. 1 system also includes a number of "skin temperature" sensors 8 (typically implemented as thermocouple sensors having fast response design), mounted in positions along straight section 14 of the reactor wall (and optionally also the conical portion of the expanded section 19) so as to protrude from the wall a short distance into the reactor (e.g., 3 to 12 mm). Sensors 8 are configured and positioned to sense the temperature $T_w$ of the resin and/or reactor gas near the wall of reactor 10 during operation. A rise in temperature readings from these sensors (e.g. a rise in temperature of 3 to 20° C. from their steady-state readings) provides an indication that a fused polymer sheet is currently forming at that location. However, these sensors provide a coincident indication of a sheeting event or other discontinuity event, rather than providing an early warning of an impending sheeting event or other discontinuity event.

Preferably, skin temperature sensors 8 of FIG. 1 (and skin temperature sensors 111 of FIG. 6) are high speed skin thermocouples. A high speed thermocouple can sense reactor temperature excursions of shorter duration than can a conventional thermocouple. Detection of such short duration temperature excursions can be necessary to generate reaction parameter data or to determine monitored reaction parameters that are useful to perform typical embodiments of the inventive method. The expression "high speed" (or "fast") thermocouple is used herein to denote a thermocouple implemented to have sufficiently fast response to be sensitive to temperature spikes of duration, for example, less than ten seconds when positioned not more than 12 mm from the reactor wall, or a thermocouple whose response has a time, for example, constant of not more than one (1) second (and preferably not more than four (4) seconds) using still water as the reference fluid in responding to a step change in water temperature from 1 to 100° C.

In particular, a high speed thermocouples may be implemented as a conventional two-wire thermocouple junction (the sensing element) contained within a thin metal sheath of 0.125 to 0.250 inches diameter. The metal sheath, with the contained thermocouple, is inserted into the reactor through a suitable sealing gland to provide the required pressure seal to prevent loss of gas from the reactor. The high speed thermocouples are preferably positioned as "skin" temperature sensors (described above), with the tips of the sensors (containing the sensing element) extending into the fluid bed a distance, for example, of 3 to 12 mm. Suitable high speed thermocouples and sealing glands are commercially available from, for example, Conax Buffalo Technologies, Buffalo, N.Y.

The one or more bed temperature sensors 16 in the fluidized bed can include at least one resistance temperature sensor positioned and configured to sense bed temperature during reactor operation at a location within reactor 10 away from the reactor wall. The resistance temperature sensor can be mounted so as to protrude into the bed more deeply than do sensors 8 (e.g., 20 to 50 cm away from the reactor wall).

Other sensors and optionally also other apparatus are employed to measure other reaction parameters during a polymerization reaction. Such other reaction parameters preferably include instantaneous and bed-averaged resin product properties (e.g., melt index and density of the polymer resin product being produced by the FIG. 1 system during a polymerization reaction). Bed-averaged resin product properties are conventionally measured by periodically sampling the resin as it exits the reactor (e.g. once per hour), and performing the appropriate tests in a quality control laboratory. Instantaneous product properties are conventionally determined by calculation methods (known in the art) based on reaction models specific to the particular catalyst in use. The reaction models typically relate gas phase concentration ratios (e.g. the 1-hexene/ethylene molar ratio and the hydrogen/ethylene molar ratio) to the instantaneous density and melt index of the polymer being produced.

Other measured reaction parameters preferably include reactor gas composition, e.g., concentrations (and partial pressures) of all reactant gases and induced condensing agents (ICAs), as well as all inert gases (such as nitrogen, hydrocarbon inerts, etc.) that are present in relevant quantities. The reactor gas composition may be measured with a gas chromatographic system 40.

It is known how to regulate process variables to control various steady-state reactions performed by the FIG. 1 system (e.g., to control gas phase composition, the concentration of induced condensing agents (ICAs) and, partial pressure of at least one reactant (e.g., ethylene), the type and properties of each catalyst introduced into reactor 10, and to use elements 30 and 32 in the manner described above to control temperature). It is also known how to control a polymerization reaction during a transition by regulating process control variables such that the product (granular polymer resin) has properties compliant with an initial specification set at the start of the transition; the product produced during the transition ceases to comply with the initial specification set at a first time, and the product has properties compliant with a final specification set at the end of the transition.

In typical embodiments of the invention, a reaction (e.g., a steady-state reaction and/or a reaction transition) performed by a polymerization reactor is controlled by adjusting (or regulating) the controlling process variables in response to at least one control variable (e.g., $MIT_R$ or $\Delta MIT$, or $MRT_R$ and $\Delta MRT$, as defined herein) determined in accordance with the invention. Each such control variable is determined (or calculated) based on the output of sensors that measure reaction parameters. Processor 50 of FIG. 2 is an example of a processor programmed to generate one or more of such control variables in on-line fashion in accordance with any embodiment of the invention in response to reaction parameters measured during a reaction (e.g., parameters determined by the output of temperature sensor 16 of FIG. 1 or temperature sensor 110 of FIG. 6, sensor 8 of FIG. 1 or sensors 111, 112, 113, and 114 of FIG. 6, or process gas chromatograph 40, or resin properties (e.g., density and MI) otherwise measured during the reaction), and to control the reaction in response to each control variable. Processor 50 may be a separate, stand alone processor, or it may be integral with other process control computers that are conventionally used to monitor and control the reactor system.

Preferably, processor 50 is configured and programmed to combine relevant measured data from all reaction monitoring instruments, and relevant calculated control variables, into an integrated computer display for presentation to users (e.g., plant operators). Such a computer display (e.g., display 60 of FIG. 2) can indicate current values of $MIT_R$, $\Delta MIT$, $MRT_R$, and/or $\Delta MRT$ as defined herein, and/or current values of other measured and/or calculated parameters such as measured bed static and/or carryover static values. The computer display can be supplemented by process alarms or advisory notices (e.g., a notice of excessive bed static or carryover static) to users to warn of conditions in the process that may be approaching those that will lead to sheeting or another discontinuity events. Such alarms or advisory notices can also be combined with recommended control actions to avoid the discontinuity event (and may be presented to the operators as part of the display 60). For example, in response to a value of $\Delta MIT$ approaching a critical range (e.g., 6 to 8° C.), an advisory could be generated and displayed (or otherwise promulgated) recommending a reduction in reactor temperature and/or isopentane concentration to avoid dome sheeting caused by excessive resin stickiness.

FIG. 6 is a block diagram of another reaction system whose operation may be monitored and optionally also controlled in accordance with the invention. FIG. 6 system includes fluidized bed reactor 100 and entrainment static probe 114. Fluidized bed reactor 100 has an annular disk flow deflector 107 at its bottom end (at the outlet of gas recycle line 104), a top expanded section (immediately below the inlet of gas recycle line 104), and a distributor plate 103 with a large number of holes (e.g., 1000 holes of 15 to 19 mm diameter) with caps over each hole. The function of the caps is to prevent the sifting of granular polymer through the holes during shutdowns when the compressor 105 is not running.

During normal operations, the fluidized bed 102 of granular polymer and catalyst particles is contained within the straight section of reactor 100. Bed 102 is fluidized by a steady flow of recycle gas through the annular disk deflector plate 107 and distributor plate 103. The flow rate of fluidizing gas is regulated to provide the fluidized bed with relatively good mixing, as illustrated in the figure.

At least one bed temperature sensor 110 is located in the fluidized bed, and is used with a control system (not shown in FIG. 6 but which can include processor 50 of FIG. 2) and an external cooling loop to control the fluidized bed temperature Trx near the process set-point. The FIG. 6 system may also include at least one "skin temperature" sensor (e.g., skin temperature sensor 111), typically implemented as a thermocouple sensor having fast response design, mounted along the reactor wall so as to protrude into fluidized bed 102 (and/or the volume above bed 102) from the reactor wall by a small amount (e.g., 3 to 12 mm). The skin temperature sensors are configured and positioned to sense the temperature $T_w$ of the resin (or other reactor contents) near the wall of reactor 100 during operation. The bed temperature sensor 110 can be or include at least one resistance temperature sensor positioned and configured to sense bed temperature during reactor operation at a location within reactor 100 away from the reactor wall. The resistance temperature sensor can be mounted so as to protrude into the bed (e.g., 20 to 50 cm away from the reactor wall) more deeply than does skin temperature sensor 111.

Relatively warm reactor gas (whose temperature has increased to substantially that of the fluidized bed during its flow through reactor 100) is withdrawn into line 104 and is pumped by compressor 105 to cycle gas cooler 106, wherein the temperature of the gas (the cooling fluid) is reduced. The relatively cool fluid from the cooler (which may contain condensed liquid) flows back into reactor 100 to cool the fluidized bed. Entrainment static probe 114 (which can be implemented as shown in FIG. 8) is positioned between compressor 105 and cooler 106, and is used to monitor the static charge generated by entrained particles within line 104. Temperature sensors (not shown) near the inlet and outlet of cooler 106 provide feedback to the control system regulate the amount by which cooler 106 reduces the temperature of the fluid entering reactor. Continuity additive feed 115 introduces a continuity additive (e.g., a slurry of AS-990 in mineral oil in one embodiment) into the fluid stream within line 104.

The cooler 106 and compressor 105 may be interchanged spatially with one another, so that either can be positioned upstream with respect to the other.

In FIG. 6, reactor static probes 112 and 113 (and optionally also at least one other reactor static probe), each of which can be implemented as shown in FIG. 7, are used to monitor the static charge transfer at or near the reactor wall within fluidized bed 102. Static probe 113 may be located in the upper portion of fluidized bed 102 and is thus sometimes referred to herein as an "upper bed" reactor static probe (or "upper bed" static probe).

In FIG. 6, additional static probes may also be used to monitor the static charge in the entrainment zone of the reactor system. In addition to the entrainment static probe 114, for example, a distributor plate static probe (which can be implemented as shown in FIG. 9) may be positioned on the distributor plate 103 to monitor the static charge transfer at or near to distributor plate 103, and an annular disk static probe (which can be implemented as shown in FIG. 10) can be positioned near the annular disk flow defector 107 to monitor the static charge transfer at or near to disk 107.

The FIG. 6 system optionally also employs other sensors and optionally also other apparatus to measure other reaction parameters during a polymerization reaction. Such other reaction parameters preferably include instantaneous and bed-averaged resin product properties (e.g., melt index and density of the polymer resin product being produced by the FIG. 6 system during a polymerization reaction). Resin product properties are conventionally measured by periodically sampling the resin as it exits the reactor (e.g. once per hour), and performing the appropriate tests in a quality control laboratory.

Other measured reaction parameters preferably include reactor gas composition, e.g., concentrations (and partial pressures) of all reactant gases and induced condensing agents (ICAs), as well as all inert gases (such as nitrogen, hydrocarbon inerts, etc.) that are present in relevant quantities. In the FIG. 6 system (as in the FIG. 1 system) the reactor gas composition may be measured with a gas chromatographic system 40.

FIG. 7 is a side cross-sectional view of a reactor static probe of a type used in some embodiments of the present invention. The reactor static probe of FIG. 7 (which can implement reactor static probe 112 and/or upper bed static probe 113 of FIG. 6) includes a probe tip 200 (typically a rounded metal disk) attached to a metal rod 209 which extends from the probe tip through insulating material 201 to an explosion-proof electrical enclosure 202. Within the explosion-proof enclosure 202, the metal rod is connected to an electrical signal cable 203 which provides electrical contact to current meter (or voltmeter) 204. A high-pressure electrical feed-through 205 provides the required pressure seal to prevent leakage of reactor gas. Electrical feed-through 205 is attached to flange 206, which attaches to reactor nozzle 207. The probe assembly is inserted through reactor nozzle 207 such that the base of the probe tip is positioned a within the fluidized bed a short distance from the wall (e.g. 1 to 10 mm from the interior surface of the wall). The insulating material 201 prevents electrical contact between the probe tip and the metal surfaces of the nozzle 207 and reactor wall 208. The insulating material is preferably fiber-reinforced phenolic. The probe tip 200 (the probe's electrode) is preferably fabricated from the same material as the reactor wall (e.g. carbon steel) so that the readings from the reactor static probe will simulate the charge transfer that occurs on other, non-instrumented sections of the reactor wall.

One or more reactor static probes can be used during monitoring operation. The reactor static probes can include (or the reactor static probe can be) an upper bed static probe (e.g., probe 113 of FIG. 6) positioned higher in the reactor than the upper limit for positioning of a conventional static probe (typically a distance above the distributor plate equal to 0.25 to 0.75 times the reactor diameter) or generally at least a distance above the distributor plate equal to 1.0 times the diameter of the reactor, and up to the point where the vertical walls of the reactor meet the conical section of the reactor. As particles (e.g., resin and/or catalyst/support particles) in the reactor flow past the probe, some of the particles strike probe tip 200 and transfer charge thereto (via the mechanism of triboelectric charge transfer), which is detectable as a current (or voltage) signal from the probe. Such current flows are positive (as measured by current meter 205) when positive charge flows from the fluidized bed to the probe tip, or when negative charge flows from the wall to the resin in the fluidized bed.

Meter 204 used to monitor readings from the reactor static probes may be any instrument or device capable of measuring the flow of current from the probe tip to ground. Suitable instruments include an ammeter, a picoammeter (a high sensitivity ammeter), a multi-meter, or electrometer. The flow of current may also be determined indirectly by measuring the voltage generated by the current in passing through a series resistor. The current in this case would be determined from the measured voltage by through Ohm's Law, $I=V/R$, where I is the current (in amperes), V is the measured voltage (in volts) and R is the resistance (in Ohms). As indicated in above-cited U.S. Pat. No. 6,008,662, the value of the series resistor may be from 1 ohm to $4\times10^{11}$ ohms, without substantially affecting the value of the current reading obtained.

One or more reactor static probes are preferably located in the lower section of the fluidized bed, preferably within 0.1 to 0.5 reactor diameters above the distributor plate. One or more reactor static probes are also positioned in the upper section of the fluidized bed, preferably 0.1 to 2.0 reactor diameters below the top of the fluidized bed.

Meter 204 is preferably bi-polar (i.e. capable of measuring both positive and negative values of current), and preferably integral with (i.e., housed within) explosion-proof electrical enclosure 202. Data from current meter 204 can be communicated to the process monitoring computer (processor 50 of FIG. 2) by means of a standard 4-20 mA instrument loop, or the data can be transmitted digitally. Because the raw signals from the reactor (or upper bed) static probes are typically quite noisy, the electrical current signals from the probes are preferably averaged over time periods from 0.1 to 100 minutes, and preferably from 0.5 to 10 minutes, to provide a smoothing of the data. Measured 1-minute averages of current flux to a reactor static probes located in the lower section of the fluidized bed during monitoring operation with Catalyst A (a metallocene catalyst described below) are typically positive or negative values in the range of minus 1.0 to plus 2.0 nanoamps per $cm^2$ of probe tip surface area.

Measured 1-minute averages of current flux to a reactor static probes located in the upper section of the fluidized bed (i.e. upper bed static probes) during monitoring operation with Catalyst A are typically positive or negative values in the range of minus 1.0 to plus 0.5 nanoamps per $cm^2$ of probe tip surface area.

FIG. 8 is a side cross-sectional view of an entrainment static probe (a carryover probe mounted in a reactor recycle line) of a type described in above-cited U.S. Patent Application Publication No. 2005/0148742. In typical embodiments of the present invention, such entrainment static probes can be located in any part of the gas recycle line (from the inlet of the recycle line at the top of the reactor to the outlet of the recycle line into the bottom of the reactor). One, or a small number (e.g., greater than one but less than 10), or a larger number, of such entrainment static probes can be positioned at one or more locations along the gas recycle line (e.g., recycle line 104 of FIG. 6). Preferably, at least one entrainment static probe is mounted on the section of recycle line located downstream of compressor 105, within 1 to 10 recycle line diameters from the compressor discharge, as shown in FIG. 6.

The entrainment static probe of FIG. 8 includes probe tip 300 (a metal rod) coupled to current meter 306 by a signal cable. Preferably, the entrainment static probe is fabricated with the metal rod 300 extending through insulating material 301 to an explosion-proof electrical enclosure 302. Within the explosion-proof enclosure 302, the metal rod is connected to an electrical signal cable 303 which provides electrical contact to current meter (or voltmeter) 304. A high-pressure electrical feed-through 305 provides the required pressure seal to prevent leakage of reactor gas. The feed-through 305 is attached mounting flange 306, which in turn is mounted on nozzle 307. The insulating material 301 between prevents electrical contact between the metal rod 300 and the metal surfaces of the nozzle 307 and recycle line wall 308.

Probe tip 300 of FIG. 8, the probe's electrode, can be any suitable conductive material, but is preferably fabricated from the same material as the wall of the recycle line (e.g. carbon steel). The insulating material 301 is preferably fiber-reinforced phenolic.

The probe may be oriented at any angle with respect to (e.g., perpendicular to) wall 301 of the recycle line. In a preferred embodiment, the probe tip 300 extends into the recycle line approximately to the center of the recycle line. In other embodiments, the probe tip 300 may extend into the recycle line a distance equal to 0.05 to 0.95 times the diameter of the recycle line, During monitoring operation, the current measured by the entrainment static probe is indicative of the rate of charge transfer to the electrode by frictional (triboelectric) contact with entrained particles (solid particles and liquid droplets) in the recycle flow. Readings from the entrainment static probe are taken to be representative of static charge transfer that occurs over the entire area of the recycle line.

The current meter 304 used to monitor readings from the entrainment static probes may be any instrument or device capable of measuring the flow of current from the probe tip to ground. Suitable instruments include an ammeter, a picoammeter (a high sensitivity ammeter), a multi-meter, or electrometer. The flow of current may also be determined indirectly by measuring the voltage generated by the current in passing through a series resistor. Current meter 304 is preferably bi-polar (i.e. capable of measuring both positive and negative values of current), and is preferably integral with (i.e. housed within) explosion-proof electrical enclosure 302.

Data from the current meter 304 can be communicated to the process monitoring computer (processor 50 of FIG. 2) by means of a standard 4-20 mA instrument loop, or the data can be transmitted digitally. Because the raw current signals from the entrainment static probes are quite noisy, the signals are preferably averaged over time periods from 0.1 to 100 minutes, and preferably from 0.5 to 10 minutes, to provide a smoothing of the data. Measured 1-minute averages of current flux to each entrainment static probe (during monitoring operation with Catalyst A) are typically positive or negative values in the range of minus 0.4 to plus 0.2 nanoamps per $cm^2$ of probe tip surface area (the area normal to the direction of gas flow).

FIG. 9 is a side cross-sectional view of a distributor plate static probe of a type used in some embodiments of the present invention. The distributor plate static probe of FIG. 9 (sometimes referred to as a distributor plate cap probe) is another means of measuring carryover static. The sensing electrode in this case is an otherwise standard distributor plate cap that is insulated from the distributor plate and connected electrically to a sensitive current meter located externally to the reactor.

The distributor plate probe of FIG. 9 is shown mounted on distributor plate 103 of the FIG. 6 system. It comprises a metal plate cap 400 positioned above one or more of the holes (e.g., hole 404) that extend through the distributor. Cap 400 is electrically insulated from the distributor plate (e.g., by phenolic insulator sleeves 402) and connected to a current meter (not shown) by an electrical signal cable 403, which is preferably a mineral insulation cable. Cap 400 is secured by bolts to insulator sleeves 402. The bolts 401 are preferably secured with double nuts or safety wire, and signal wire 406 of cable 403 is attached to one of these bolts. As in the probes of FIGS. 7 and 8, the electrical signal cable (cable 403 of FIG. 9) is passed through the reactor wall (by means of a high pressure electrical feed-through mounted on a reactor nozzle) and is coupled to a current meter (ammeter) for measurement of the current signal. In addition to serving as the electrode of the distributor plate static probe, distributor plate cap 400 also serves the conventional function of preventing resin from the fluid bed from sifting through the hole in the distributor cap when the recycle flow is turned off. Plate cap 400 is preferably fabricated from the same material as the other, non-instrumented caps on the distributor plate (e.g. carbon steel).

During monitoring operation, the current measured by the distributor plate static probe is indicative of the rate of charge transferred to the distributor plate by frictional (triboelectric) contact of entrained particles (solid particles and liquid droplets) in the recycle flow, and frictional contact with resin in the fluid bed. Readings from the distributor plate static probe are taken to be representative of static charge transfer that occurs in normal operation over the entire area of the distributor plate.

Current readings from the distributor plate static probe are measured with any of the current or volt meters described above or known in the art. As with the other static probes, the readings are preferably averaged over time windows from 0.1 to 100 minutes, and more preferably from 0.5 to 10 minutes, to provide a smoothing of the data. Measured 1-minute average values of current flux to each distributor plate static probe (during monitoring operation with Catalyst A) are typically positive or negative values in the range of minus 5.0 to plus 13 nanoamps per $cm^2$ of probe tip surface area (in this case the relevant area is the underside area of the plate cap). Current flux readings from the distributor plate static probes are thus substantially higher than those of the other static probes described herein. This result is believed to be due to the relatively high velocity of gas and liquid that flows through the holes in the distributor plate (e.g. 100 to 200 ft./sec.). These higher velocities (relative to other sections in the reactor) generate correspondingly higher speeds of particle impact against the electrode (the underside of the plate caps). The higher impact of collisions, together with a more concentrated stream of particles impacting the electrode (both liquid and solid particles) produces, in many cases, a significantly higher rate of triboelectric charging (i.e. current flux).

FIG. 10 is a side cross-sectional view of an annular disk static probe of a type used in some embodiments of the present invention, mounted on annular disk 107 of the FIG. 6 system. The stream of cooled and recycled fluid (typically including entrained solid particles) that flows into a fluidized bed reactor typically flows at relatively high speed from the gas recycle line through the inlet to the reactor and through the central opening of an annular disk flow deflector mounted at the inlet. Disk 107 is an example of such an annular disk flow deflector. Its purpose is to provide increased liquid turbulence (and washing) in the reactor bottom section to minimize the potential for liquid accumulation, or "pooling," below the distributor plate.) In a class of embodiments of the invention, one or more annular disk static probes (having the design shown in FIG. 10 or another design) are mounted on or near the annular disk of a fluidized bed reactor system.

The annular disk static probe of FIG. 10 includes probe tip 500 (preferably a metal rod) coupled to current meter 504 by signal cable 503 (preferably a mineral insulation cable or other cable having a conductor encased within protective tubing). Cable 503 extends from within reactor 100, through nozzle 507 (which defines an opening in the wall of reactor 100) and through high pressure feed-through 505, and through explosion-proof enclosure 502 to meter current meter 504. Probe tip 500 (the probe's electrode) is preferably made of carbon steel and welded to steel support plate 509 which is mounted on electrical insulating block 501 (preferably made of phenolic plastic) using four bolts (not shown). The insulating block serves to prevent electrical contact between the probe tip 500 and the metal surfaces of the annular disc 107. Insulating block 501 is attached to annular disk 107 with another set of four bolts (also not shown). All bolts used to mount the probe are preferably secured with double nuts or safety wire.

Probe tip 500 serves as the probe's electrode. Entrained solid and liquid particles in the recycle flow impact the electrode and transfer electrical charge to or from the electrode. The rate of charge flow is measured as a current signal in external current meter 504. Probe tip 500 is preferably fabricated from a metal rod composed of the same material as the annular disk (e.g. carbon steel) so that current readings from the probe will provide an estimate of the charge transfer that occurs from other sections of the annular disk. The probe tip (metal rod) is preferably 5 to 40 mm diameter. It may project into the central opening of the annular disk by a distance equal to 0.05 to 1.0 times the size of the inner diameter of the annular disk, and preferably by 0.1 to 0.2 times the inner diameter of the annular disk.

Current readings from the annular disc static probe can be measured with any of the current or volt meters described above. The readings from the current (or volt) meter are preferably averaged over time windows from 0.1 to 100 minutes, and preferably from 0.5 to 10 minutes. Measured 1-minute averages of current flux to each annular disk static probe (during monitoring operation with Catalyst A) are typically positive or negative values having absolute magnitude in the range of 0 to 2.5 nanoamps/cm$^2$ of probe tip surface area (in this case the relevant area is the surface area of the probe tip that extends over the opening in the annular disk, and that is normal to the direction of gas flow).

One or more of the static probes described with reference to FIGS. 7-10 (or one or more other static probes) positioned at any location in the entrainment zone (defined above) may function as a static probe whose output is determinative of the imminence of sheeting (in accordance with a class of embodiments of the inventive method). One or more static probes can be employed at each of at least two such locations (e.g., recycle line, annular disk, upper bed and/or distributor plate static probes), and the outputs of the static probes can be used separately or in conjunction with each other to be determinative of the imminence of sheeting (e.g., if one probe at one entrainment zone location begins to register static activity, or only if two or more probes begin to register static activity, corrective action may be taken to reduce or eliminate the likelihood that sheeting will occur. Such corrective action may include the introduction of a continuity additive, as described in, for example, U.S. Patent Application Publication No. 2005/0148742, or in the case that one or more continuity additives are already in the reactor (for instance due to being fed with the catalyst), then by the addition of additional continuity additives, e.g., through a feed other than the catalyst feed).

Electrostatic activity in a reactor system can be monitored by the specific static probes described herein or other static probes. A static probe typically includes a metallic probe tip, one or more signal wires, an electrical feed-through, and a measuring instrument. The probe tip may comprise a cylindrical rod, but could be any cross sectional form such as square, rectangular, triangular, or oblong. In various embodiments, the probe tip is made of any of a variety of conductive materials. With respect to the signal wires, any conventional insulated wire may be used. With respect to the electrical feed-through, any suitable feed-through may be used as long as it provides the necessary electrical isolation from ground (and the reactor walls), and provides the required pressure seal to prevent leakage of high pressure reactor gases from the reactor. Electrical feed-throughs suitable for use in typical embodiments of any of the static probes described herein are available commercially (e.g. from Conax Buffalo Corp.).

As noted above, some embodiments of the inventive method include a step of monitoring reaction parameters and generating (in on-line fashion) reaction parameter data, other than carryover static data or bed static data, indicative of resin stickiness (e.g., the stickiness monitoring and control parameter $\Delta$MIT defined above). Optionally, the reaction parameter data are data indicative of a critical temperature below which resin in a polymerization reactor is not expected to become sticky (as described in the above referenced U.S. Pat. No. 7,122,607).

In some embodiments, such a step of generating (in on-line fashion) reaction parameter data indicative of the degree of resin stickiness includes the steps of:

monitoring a polymerization reaction which produces a polymer resin in a fluid bed reactor (e.g., reactor 10 of FIG. 1 or reactor 100 of FIG. 6), wherein the polymer resin has a dry melt reference temperature, and the dry melt reference temperature (sometimes referred to herein as a "dry MRT") is a temperature characteristic of melting behavior of a dry version of the polymer resin; and in response to data indicative of at least one monitored parameter of the reaction, determining, in on-line fashion, a reduced melt reference temperature (sometimes referred to herein as "MRT$_R$") characteristic of the melting behavior of the polymer resin as it exists in the reactor. The reduced melt reference temperature ("MRT$_R$") is a temperature characteristic of melting behavior of the polymer resin the presence of hydrocarbon diluent (e.g., condensable diluent gas or gases) with the resin in the reactor, and is at least substantially equal to the difference between the dry MRT and a melt reference temperature depression value, "D," where D is a temperature by which the dry MRT is depressed by the presence of hydrocarbon diluent with the resin in the reactor. In some embodiments, the method also includes the step of determining a stickiness monitoring and control parameter from the reduced melt reference temperature. Typically, the stickiness monitoring and control parameter (sometimes referred to herein as a "$\Delta$MRT" value) is a temperature value indicative of the degree of resin stickiness, and is at least substantially equal to Trx-MRT$_R$, where Trx is current reactor temperature.

Some such embodiments of the inventive method also include the step of controlling the reaction in response to the reduced melt reference temperature or stickiness monitoring and control parameter (e.g., in response to a $\Delta$MRT value), for example by maintaining bed temperature in a predetermined relation with (e.g., below) the reduced melt reference temperature or a temperature (or temperature range) related to the reduced melt reference temperature.

The dry MRT is any distinct and measurable temperature that is characteristic of melting behavior of a dry version of the polymer resin, and can be defined or determined in any of a variety of different ways, including as:

a peak melt temperature as determined from a first or second melt DSC ("differential scanning calorimetry") measurement on a dry sample of the polymer resin;

a polymer Seal Initiation Temperature measured on a resin film sample (for example, a Seal Initiation Temperature as described in U.S. Pat. No. 7,122,607);

a resin Hot Tack Initiation Temperature (for example, a Hot Tack Initiation Temperature as described in U.S. Pat. No. 7,122,607);

a dry sticking temperature of granular polymer in a fluid bed (for example, a dry sticking temperature as described in U.S. Pat. No. 7,122,607);

a temperature at which the polymer resin is expected to melt or begin to melt in the reactor vessel with the reactor operating at normal pressure and gas velocity but in the presence of substantially pure nitrogen rather than the gas components actually present with the resin in the reactor during the reaction; or a dry Melt Initiation Temperature (MIT) determined graphically as the onset of rapid melting in a first or second melt DSC curve determined from a DSC measurement on a dry sample of the polymer. Such a dry MIT is preferably determined from a first melt DSC measurement on a sample of a dry version of the polymer (a sample of the polymer resin with no significant amount of diluent hydrocarbon present therewith).

Below (with reference to FIGS. 3-5 and Equations 1-15), we describe exemplary embodiments in which the dry MRT is a dry melt initiation temperature ("dry MIT") determined graphically as the onset of rapid melting in a first or second melt DSC curve determined from a DSC measurement on a dry sample of polymer resin of the type being produced.

FIG. 3 shows a first melt DSC curve generated from measured data for the polymer listed in Row 6 of Table 1 (produced by polymerization using the catalyst listed in Row 6 of Table 1). The melt initiation temperature MIT is taken as the point of rapid onset of melting. Quantitative values may be obtained graphically as the intersection of the two tangent lines as shown. For this particular polymer, the peak melting temperature was determined 116.1° C., and the MIT was determined as 97.4° C.

FIG. 4 illustrates the effect of dissolved hydrocarbons in shifting (or "displacing" or "depressing") the polymer melt curve. The effect of these dissolved components, principally dissolved ICA, comonomer and isomers of the comonomer, is assumed in the present work to displace the entire melt curve (shown in FIG. 3 and also shown as a dashed curve in FIG. 4) towards lower temperatures, resulting in the displaced curve indicated in FIG. 4. The polymer peak melting temperature is displaced downwards, along with the MIT. The amount of displacement is denoted as D (in units of temperature, ° C.), and is calculated using the Flory melt depression equation and appropriate data (or correlations) for the solubility of condensable hydrocarbons in the polymer. The displaced value of MIT is denoted as $MIT_R$.

FIG. 5 illustrates a calculation of the stickiness monitoring and control parameter $\Delta MIT$. This is computed as $\Delta MIT = TX - MIT_R$, and represents the extent by which the reactor bed temperature exceeds (or "overlaps") the displaced value of the MIT. The physical units of $\Delta MIT$ are in units of temperature, ° C. The $\Delta MIT$ incorporates all known process variables that affect resin stickiness (e.g., resin density and MI, reactor temperature Trx, and hydrocarbon concentrations and solubilities) into a single variable that can be monitored on-line (during a reaction) and used as the basis for control of the reactor to prevent problems associated with excessive stickiness, and/or to maximize reactor production rates. Limiting values of $\Delta MIT$ correspond to limiting values of stickiness, and may be different for different catalyst systems. For polymers produced with Catalyst A (a metallocene catalyst described below) the limiting value of $\Delta MIT$ was determined to be in the range of 6 to 8° C.

Embodiments of the present invention determine an estimated degree of depression of a dry melt initiation temperature (or, more generally, a dry melt reference temperature) for a polymer resin due to presence of at least one diluent (e.g., ICA, comonomer, and at least one isomer of the comonomer) with the resin in a reactor during a polymerization reaction, from at least one parameter of the reaction measured on an on-line basis and using a predetermined melt initiation temperature depression model based on the Flory melt depression equation. As discussed above, the presence of condensable diluent (e.g., comonomer and condensing agents, and isomers of comonomers) depresses the dry melt initiation temperature of polymer resin (e.g., polyethylene) in a gas phase polymerization reactor. The magnitude of the depression of the dry melt initiation temperature may be sufficient to bring the reduced melt initiation temperature near to (or below) the reaction temperature. The model employed in the noted embodiments relates the dry melt initiation temperature of a dry version of the polymer resin (which itself is typically determined by a predetermined correlation with resin melt index and density) and the reduced melt initiation temperature of the polymer resin in the presence of significant amounts of the diluent components (typically soluble hydrocarbons) that are present with the resin while the resin is produced. By processing data indicative of the reactor temperature, and the concentration, solubility, and liquid densities of the diluent components in accordance with the model, the reduced melt initiation temperature can be determined in accordance with the invention from the dry melt initiation temperature. The model (sometimes referred to herein as a melt initiation temperature depression model or MIT depression model) can be readily programmed into a stand-alone computer or a conventional plant DCS system to provide an on-line monitor of combinations of process conditions that lead to resin stickiness. This provides for the ability to adjust reactor conditions to avoid excessive stickiness (i.e., to avoid limiting values of $\Delta MIT$) and thereby reduce the likelihood of sheeting incidents.

In a class of embodiments, the method includes the steps of: determining a dry melt initiation temperature for polymer resin being produced, preferably by characterizing a DSC (differential scanning calorimetry) melting curve for a dry version of the resin being produced; and estimating the amount by which the dry melt initiation temperature is depressed due to the presence of the condensable diluent component(s) actually present with the resin being produced in the reactor. In characterizing such a DSC melting curve, an inflection point in the DSC melting curve is typically identified as the dry melt initiation temperature (MIT). Using the Flory melt depression equation, these embodiments determine a reduced melt initiation temperature ($MIT_R$) at which the resin in the reactor will begin to melt in the presence of the condensable diluent gases (e.g., soluble hydrocarbons) that are present with the resin during the reaction. The reduced melt initiation temperature, $MIT_R$, is at least substantially equal to MIT–D, where MIT is the dry melt initiation temperature, and D is an estimated degree of MIT depression, caused by the highly soluble diluent gas components in the reactor.

The methodology for estimating the depression D of the dry melt initiation temperature is based on the Flory melt depression equation and existing models for vapor solubility in the polymer resin. The noted embodiments typically determine a single calculated parameter, $\Delta MIT$, which is the difference between the reactor temperature, Trx, and $MIT_R$, to quantify the degree to which the reactor temperature overlaps the (depressed) melting curve, and thus quantify the degree of resin stickiness.

The expression "DSC melting curve" for dry version of polymer resin herein denotes an experimentally determined relationship between the rate at which heat is absorbed by a sample of the dry resin (e.g., in units of mW/g) versus temperature of the sample, as determined from DSC melting curve data resulting from differential scanning calorimetry measurements on the sample. Two types of DSC melting curves are "first melt" and "second melt" curves. A first melt curve is determined by measurements on a sample that has not previously been melted. A second melt curve is determined by measurements on a sample that has previously been melted, in the sense that the sampled is melted in a first scan through the DSC, then cooled back to ambient temperature, and then slowly reheated for the second DSC test. DSC melting curves employed in preferred embodiments of the invention are first melt curves, since first melt data are believed to reflect the true melt curve of polymer resin as it exists in a polymerization reactor more accurately than second melt data.

Some embodiments of the inventive method that employ a melt initiation temperature depression model (e.g., one based on and implementing the Flory melt depression equation) include the steps of:

(a) during a polymerization reaction in a fluid bed reactor which produces a polymer resin, measuring current values of parameters of the reaction including reactor temperature, at least one resin property (e.g., density and melt index) of the polymer resin, and concentration (e.g., partial pressure) of at least one condensable diluent gas in the reactor (e.g., partial pressures of ICA, comonomer, and at least one isomer of the comonomer in the reactor);

(b) determining, from at least one of the current values of the at least one resin property based on a predetermined correlation between resin melting temperature and said at least one resin property, a dry melt initiation temperature value ("dry MIT value" or "MIT") indicative of a temperature at which a dry version of the polymer resin is expected to begin to melt (e.g., a temperature at which the polymer resin in the reactor is expected to begin to melt in the absence of any significant amount of condensable diluent gas that is actually present in the reactor during the reaction). Typically, the dry MIT value is determined using a database including previously measured MIT values (determined from DSC measurements) as a function of resin properties (density, MI, etc.);

(c) during the reaction, using a melt initiation temperature (MIT) depression model to determine in on-line fashion a reduced melt initiation temperature at which the polymer resin is expected to begin to melt in the presence of the at least one condensable diluent gas in the reactor, said model identifying an estimated degree of depression of the dry MIT value due to presence of at least one diluent with the polymer resin (e.g., the presence of the condensable diluent gas actually present with the polymer resin in the reactor during the reaction). Preferably, the MIT depression model implements the Flory melt depression equation; and (d) determining in on-line fashion a temperature value indicative of resin stickiness in the reactor, from the reduced melt initiation temperature determined in step (c) and a current value of the reactor temperature.

Steps (b) and (c) can be performed in any of a variety of ways, including by accessing one or more look-up tables prepared in accordance with the predetermined correlation or the model.

Typically, the reduced melt initiation temperature determined in step (c) is a temperature ($MIT_R$) above which resin in the reactor (in the presence of condensable diluent gas) is predicted to begin to melt. In some embodiments, the temperature value generated in step (d) is a temperature value, $\Delta MIT$, which is at least substantially equal to $Trx-MIT_R$, where Trx is the current reactor temperature, and $MIT_R$ is the reduced melt initiation temperature determined in step (c). Typically, $MIT_R$ is at least substantially equal to MIT−D, where MIT ("melt initiation temperature") is the dry MIT value determined in step (b), D is an estimated degree of MIT depression due to the presence of the at least one condensable diluent gas with the resin in the reactor. In other embodiments, the temperature value generated in step (d) is a temperature value otherwise indicative of the degree of resin stickiness in the fluid bed.

Preferably, steps (a)-(d) are performed repeatedly (e.g., on an ongoing basis) during the reaction to generate a sequence of temperature values indicative of resin stickiness in the reactor (e.g., a sequence of values of $\Delta MIT$ or data indicative of a time-varying value of $\Delta MIT$), and the method also includes the step of:

(e) controlling the reaction to maintain (or attempt to maintain) resin stickiness in the reactor in a predetermined relationship with a predetermined limiting value or range of values (e.g., to maintain a current value of $\Delta MIT$ in a predetermined relationship with a predetermined limiting temperature value or range of values).

For some embodiments in which the reaction controlled in step (e) is a polyethylene polymerization reaction using a metallocene catalyst to be referred to as Catalyst A (described below), and the temperature value generated in step (d) is a stickiness monitoring and control parameter $\Delta MIT$ which is at least substantially equal to $Trx-MIT_R$. Such a temperature value $\Delta MIT$ has been correlated with measured data characterizing the same type of polyethylene polymerization reaction (performed using Catalyst A). The data characterized several wall and dome sheeting incidents that occurred during the reaction, as well as normal operation that occurred without sheeting. The correlation determined that when the $\Delta MIT$ value exceeded a critical value (determined to be in the range 6° C. to 8° C.), the likelihood of dome sheeting increased significantly. The correlation also determined that maintaining the $\Delta MIT$ value below this critical value is critical to avoid dome sheeting during a reaction of the type analyzed. Thus, in these embodiments, step (e) preferably maintains (or attempts to maintain) the reaction parameters so that $\Delta MIT$ is in a predetermined limiting range from 5° C. to 6° C. (or less than a predetermined limiting value from 6° C. to 8° C.).

For some other polyethylene polymerization reactions using a catalyst other than above-noted Catalyst A, the temperature value generated in step (d) is a stickiness monitoring and control parameter $\Delta MIT$ which is at least substantially equal to $Trx-MIT_R$), and step (e) maintains (or attempts to maintain) the reaction parameters so that $\Delta MIT$ is in a predetermined limiting range which is found (in commercial experience) to be appropriate for that catalyst. With these other catalyst systems the range of $\Delta MIT$ values required to avoid excessive resin stickiness may be different than 6° C. to 8° C. The limiting $\Delta MIT$ values (or range of values) for these catalysts are taken as those that are found to correlate with discontinuity events (sheeting, chunking and/or rapid fouling of the distributor plate or cycle gas cooler) with the particular catalyst in a commercial reactor system.

We next describe an example of performance of step (c), assuming that a dry melt initiation temperature value has been determined in step (b).

In light of thermodynamic considerations, the presence of a soluble, condensable substance (e.g., a hydrocarbon reduces the melting temperature of a polymer. A relationship, known as the Flory melt depression equation, for the melting point depression of a high molecular weight polymer by a diluent is given in Fried, J. R., *Polymer Science and Technology*, Prentice Hall, Upper Saddle River, N.J., 1995, as:

$$\frac{1}{T_m} - \frac{1}{T_m^0} = \left(\frac{R}{\Delta Hu}\right)\left(\frac{Vu}{Vs}\right)(\phi_1 - \chi\phi_1^2) \quad (1)$$

where:
R is the gas constant,
Vu is the molar volume of the polymer repeat unit,
Vs is the molar volume of the diluent,
$T_m$ is the peak melting temperature of the polymer with diluent (° C.),
$T_m^0$ is the peak melting temperature of the polymer without diluent (° C.),
$\Delta Hu$ is the enthalpy of fusion for the polymer repeat unit (850.6 cal/mol),
$\phi_1$ is the volume fraction of diluent (single or multi-component), and
$\chi$ is a binary interaction parameter,
the parameter $\chi$ is defined by the above reference as:

$$\chi = \chi_S + \chi_H = \chi_S + \frac{V_1}{RT}(\delta_1 - \delta_2)^2 \approx 0.34 + \frac{V_1}{RT}(\delta_1 - \delta_2)^2 \quad (2)$$

where:
$\delta_1$ is the solubility parameter of the diluent, and
$\delta_2$ is the solubility parameter of the polymer.
For a diluent that is a mixture of gases:

$$\delta_1 = \delta_{max} = \Sigma \delta_i f_i \quad (3)$$

where $f_i$ is the volume fraction of diluent component i, and $\delta_i$ is the solubility parameter of component i, and where the sum of volume fractions for all diluent components equals 1. Equation 3 is substituted into Equation 2 to calculate $\chi$ for mixtures.

Solving for Tm in Equation 1, the following expression is obtained:

$$Tm = \frac{1}{\frac{1}{Tm^0 + 273.15} + \left[\frac{R}{\Delta Hu} \cdot \frac{Vu}{Vs} \cdot (\phi_1 - \chi \cdot \phi_1^2)\right]} - 273.15 \quad (4)$$

This equation predicts the peak melting temperature of a polymer as a function of soluble components. In the example, $T_m^0$ is the peak melt temperature determined from a first melt DSC curve for the polymer, and $T_m^0$ is the peak melt temperature expected for the polymer in the presence of the diluent. In light of thermodynamic considerations, the effect of the soluble diluents is to reduce (or "depress") the peak melting temperature, hence $T_m$ is always less than $T_m^0$ in the presence of one or more soluble diluents, and the difference $T_m^0 - T_m$ is always positive.

In the present example, it is necessary to estimate the degree of depression of the melt initiation temperature, MIT. The required depression of the MIT is taken as equal to the depression of the peak melting temperature, as determined above from the Flory equation. Defining the parameter D as the depression (or displacement) of the melt initiation temperature, $$D = T_m - T_m^0 \quad (5)$$

The reduced melt initiation temperature is determined in step (c) from the melt initiation temperature (determined in step (b)) as $$MIT_R = MIT - D \quad (6)$$

In the example, the temperature value generated in step (d) is a temperature value $\Delta MIT = Trx - MIT_R$, where Trx is the current reactor temperature, and $MIT_R$ is given by Equation 6. The value $\Delta MIT$ is the difference between the reactor temperature (Trx) and the melt initiation temperature of the polymer, accounting for the depression in melting point for soluble hydrocarbons. A positive value of $\Delta MIT$ indicates the extent to which the reactor temperature exceeds the depressed melt initiation temperature.

In order to use Equation 4, relationships for the solubility of diluent components in the polymer are required. One such generalized relationship, described in Stiel, L. I., et al., *J. Appl. Poly. Sci.*, v. 30, 1145-1165, 1985, provides an estimate of a Henry's Law constant as:

$$\ln\left(\frac{1}{Kp}\right) = -1.561 + (2.057 + 1.438\omega)\left(\frac{Tc}{T}\right)^2 \quad (7)$$

where:
Kp is the Henry's Law constant,
$\omega$ is an acentric factor,
Tc is the critical temperature of the diluent (° K), and
T is the temperature (° K).
To calculate the vapor solubility, the following equation was presented by Stiel et al., (cited above):

$$P y_1 = Kp \cdot V_1^0 \quad (8)$$

where:
P is the reactor total pressure (atm),
$y_1$ is vapor phase mole fraction, and
$V_1^0$ is vapor solubility in cm³ diluent/g polymer at 273.2° K and 1 atmosphere pressure.
By combining Equations 7 and 8, the vapor solubility of diluent (in units of weight fraction) can be expressed as:

$$S = P \cdot Mw \cdot \frac{\exp\left(-1.561 + (2.057 + 1.438\omega)\left(\frac{Tc}{T}\right)^2\right)}{R \cdot Ta} \quad (9)$$

where
Ta is 273.15 (° K),
R is the gas constant (82.06 cm³·atm/mol·° K), and
Mw is the molecular weight of the diluent,
or:

$$S = P \cdot Mw \cdot \frac{\exp\left(-1.561 + (2.057 + 1.438\omega)\left(\frac{Tc}{T}\right)^2\right)}{22414.7} \quad (10)$$

If P is in units of bars (rather than atmospheres), the constant in the denominator of Equation 10 is 22710.9.

To calculate the melting point depression by Equation 4, the volume fraction of diluent $\phi$ in the polymer must be estimated. Assuming additive volumes, the following relationship applies:

$$\phi_{mix} = \frac{\frac{Ms}{\rho s}}{\frac{Ms}{\rho s} + \frac{1-Ms}{\rho_p}} \quad (11)$$

where:
Ms is the mass fraction of diluent,
$\rho_s$ is the density of the diluent (in g/cm$^3$), and
$\rho_p$ is the density of the polymer (in g/cm$^3$)

Other vapor solubility equations can be used as alternatives to Equation 10. For example, for polymerization reactions in which ethylene is present and isopentane is used as a diluent, the following relationship for vapor solubility S (in units of weight fraction) can be used:

$$S = a(1-\rho)^{b1} MI^c e^{d/Trx} P^e \quad (12)$$

where MI is the polymer melt index, $I_2$ (g/10 min), $\rho$ is the polymer density (g/cm$^3$), Trx is the reactor temperature (in ° K), P is the hydrocarbon partial pressure at the resin conditions (in psia), and a, b1, c, d, and e are predetermined parameters.

As another example, for polymerization reactions in which 1-butene and 1-hexene are diluents, the following relationship for vapor solubility S (in units of weight fraction) can be used:

$$S = aPe^{\left(\left(b1 + \frac{b2}{T} - b3\right)P\right)} e^{c/Trx} (1-\rho)^d MI^e \quad (13)$$

where (again) MI is the polymer melt index ($I_2$, g/10 min), $\rho$ is the polymer density (g/cm$^3$), Trx is the reactor temperature (in ° K), P is the hydrocarbon partial pressure at the resin conditions (in psia), and a, b1, c, d, and e are predetermined parameters.

In the example, diluent mixture molar volumes are utilized. Well known methods such as the Rackett method using the Chueh-Prauxnitz mixing rules or the Hankinson-Brobst-Thomson method for mixtures may be applied. Molar volumes used herein were calculated using the modified Rackett method using the Chueh-Prausnitz mixing rules (as described in Reid, R. C., et al., *The Properties of Gases and Liquids*, 4$^{th}$ ed., McGraw-Hill, New York, 1987):

To estimate $\chi$ in Equation 4, the volume fraction of each soluble component is also utilized. In the example, the $\chi$ parameter was computed by modifying Equation 2 as follows:

$$\chi = 0.34 + \frac{V_1}{RT_{rx}} \left( \sum_i \delta_i \frac{S_i}{\sum_i S_i} - \delta_P \right) \quad (14)$$

where:
$\delta_p$ is polymer solubility parameter,
$\delta_i$ is the solubility parameter of diluent component i,
$S_i$ is defined by Equation 10, and
The temperature T is taken as the reactor bed temperature Trx.

In the example, melt DSC measurements were made for a series of polymers (produced with a variety of catalysts) before step (b) was performed. Table 1 shows the melt index (MI) and density ($\rho$) of each polymer, the catalyst employed to produce the polymer (and included with the polymer sample measured), and the melt initiation temperature and peak melt temperature determined for the polymer. The density of the polymers ranged from 0.909 to 0.966 g/cm$^3$ and their melt indices ranged from 0.81 to 19.0 g/10 min.

In Table 1 and elsewhere herein polymer density refers to density measured in accordance with ASTM 1505-98. A plaque is made and conditioned for one hour at 100° C. to approach equilibrium crystallinity; measurement for density is then made in a density gradient column. The melt index (MI) is measured in accordance with ASTM D 1238-E (190° C., 2.16 kg).

In Table 1 and elsewhere herein, "Catalyst A" is a metallocene catalyst described in WO 99/61486A1, wherein it is also designated as "Catalyst A." WO 99/61486A1 teaches (on page 29) the following method for preparing this catalyst: "Davison grade 948 silica (available from W.R. Grace, Davison Chemical Division, Baltimore, Md.) was dehydrated to 600° C. and used as the support. The dehydrated silica (850 g) was charged into a 2 gallon reactor and 1060 ml of 30 wt % methylaluminoxane (MAO) (available from Albemarle Corporation, Baton Rouge, La.) was added with slow agitation. Toluene (2000 ml) was then charged to the reactor and the mixture was allowed to stir at 150° F. (66° C.) for 4 hours. Following the MAO reaction time, 23 grams of bis-(1,3-methyl-n-butyl cyclopentadienyl) zirconium dichloride was added as a 10 wt % solution in toluene. Reaction time for the bulky ligand metallocene-type catalyst compound was 1 hour after which the catalyst system was dried with $N_2$ under a vacuum. Drying time was 3 hours at 150° F. (66° C.) and at a reduced agitator speed of 30 rpm. A total of 1200 grams of dried free flowing catalyst was isolated."

In Table 1 and elsewhere herein, "Catalyst B" is a metallocene catalyst described in WO 99/61486A1. The catalyst is identified as "Catalyst D" in the publication, and is based on a "bulky ligand metallocene-type catalyst compound", dimethylsilyl-bis(tetrahydroindenyl)zirconium dichloride ($Me_2Si(H_4Ind)_2ZrCl_2$), which is available from Albemarle Corporation, Baton Rouge, La." WO 99/61486A1 teaches (page 32, line 11, to page 33, line 11) the following method for preparing this catalyst: "The ($Me_2Si(H_4Ind)_2ZrCl_2$) catalyst compound was prepared on Crosfield ES-70 grade silica which is dehydrated at 600° C. having an approximately a 1.0 weight percent water content. The Crosfield ES-70 grade silica having an Average Particle Size of 40 microns is available from Crosfield, Manchester, England. The first step in the manufacture of the supported metallocene-type catalyst above involves forming a precursor solution. 460 lbs (209 kg) of sparged and dried toluene is added to an agitated reactor after which 1060 lbs (482 kg) of a weight percent methylaluminoxane (Albemarle Corp., Baton Rouge, La.) is added. 947 lbs (430 kg) of a 2 weight percent toluene solution of a dimethyl silylbis(tetrahydroindenyl)zirconium dichloride catalyst compound and 600 lbs (272 kg) of additional toluene are introduced into the reactor. The precursor solution is then stirred at 80° F. to 100° F. (26.7 to 37.8° C.) for one hour. While stirring the precursor solution above, 850 lbs (386 kg) of 600° C. dehydrated silica as described above is added slowly to the precursor solution and the mixture agitated for 30 min. at 80° F. to 100° F. (26.7 to 37.8° C.). At the end of the 30 min. agitation of the mixture, 240 lbs (109 kg) of a 10 weight percent toluene solution of AS-990 (N,N-bis(2-hydroxylethyl)octadecylamine ($C_{18}H_{37}N(CH_2CH_2OH)_2$) available as Kemamine AS-990 (from) Witco Corporation, Memphis, Tenn., is added together with an additional I 10 lbs (50 kg) of a toluene rinse and the reactor contents then mixed for 30 min. while heating to 175° F. (79° C.). After 30 min. vacuum is applied and the catalyst mixture dried at 175° F. (79° C.) for about 15 hours to a free flowing powder. The final catalyst weight was 1200 lbs (544 kg) and had a Zr wt % of 0.35 and an Al wt % of 12.0."

In Table 1 and elsewhere herein, "Catalyst C" is a supported Ziegler-Natta catalyst prepared according to U.S. Pat. No. 4,302,566. This catalyst is prepared in three steps. In the first step, W.R. Grace & Co. 955 silica dehydrated at 600° C. is reacted with triethylaluminum (AlEt3) at 60° C. in isopentane, solvent is removed and the resulting product is dried. In the second step, a solution of $MgCl_2$ and $TiCl_3 \cdot 1/3 AlCl_3$ dissolved in THF is mixed at 60° C. with the product formed in the first step, solvent is removed and the resulting product is dried to reduce the THF concentration in the product to the range of 0.13 to 0.15. In the third step, the product formed in the second step is reacted with $Et_2AlCl$ and Al(n-hexyl)3 at 60° C. in isopentane, the solvent is removed and the product is dried. The quantity of $Et_2AlCl$ used in the third step is such that the molar ratio of $Et_2AlCl$/THF is 0.50. The quantity of Al(n-hexyl)3 used in the third step is such that the molar ratio of Al(n-hexyl)3/THF is 0.30.

For each polymer evaluated, only the first melt DSC was used because this is believed to be more representative of the polymer as it exists in the reactor than the more conventional second melt DSC curves. The second melt DSC curves may be significantly different than first melt DSC curves, typically showing lower peak melting temperatures and a sharper melt peak. In the data of Table 2 below, the DSC curves were generated with a temperature ramp rate of 10° C./minute, and with a typical sample quantity of 4.5 mg.

TABLE 1

| Catalyst | Melt Init. Temp (° C.) | Peak Melt Temp (° C.) | Melt Index (dg/min) | Density (g/cc) |
|---|---|---|---|---|
| A | 87.1 | 114.2 | 0.97 | 0.909 |
| A | 86.0 | 110.1 | 7.83 | 0.912 |
| A | 85.1 | 113.3 | 1.03 | 0.913 |
| A | 85.5 | 108.4 | 11.7 | 0.912 |
| A | 86.0 | 110.2 | 5.11 | 0.912 |
| A | 97.4 | 116.1 | 1.04 | 0.917 |
| A | 96.4 | 122.2 | 0.81 | 0.924 |
| A | 95.5 | 113.3 | 3.37 | 0.917 |
| C | 111.2 | 127.5 | 1.9 | 0.942 |
| C | 125.8 | 135.5 | 8.2 | 0.966 |
| C | 97.0 | 121.8 | 1.0 | 0.918 |
| C | 97.7 | 119.5 | 2.0 | 0.918 |
| C | 95.0 | 122.6 | 22 | 0.925 |
| C | 108.7 | 127.0 | 3.3 | 0.935 |
| C | 116.0 | 128.1 | 19 | 0.953 |
| B | 96.9 | 113.8 | 1.06 | 0.921 |
| B | 85.4 | 110.6 | 4.55 | 0.912 |

The peak melt temperature for each polymer sample was determined from the DSC measurements. A melt initiation temperature (i.e., the dry MIT) for each polymer was determined as the initial point of inflection of a DSC curve (preferably a first melt DSC curve) for the polymer, as illustrated in FIG. 3.

It is contemplated that in alternative embodiments, a melt initiation temperature (e.g., a dry MIT or other dry MRT) for each polymer could be determined in other ways. An inflection point of a DSC curve (generated from measurements on a sample of a dry version of the polymer with no significant amount of diluent hydrocarbon present therewith) is a point of rapid onset of melting as indicated by the DSC curve, and thus the temperature at which the inflection point occurs can determine a dry melt initiation temperature.

An inflection point in a DSC melting curve (occurring at a temperature to be considered the melt initiation temperature) can be identified graphically from the DSC curve. For example, such an inflection point can be identified by locating the peak melt temperature indicated by the DSC curve (the temperature at which heat is absorbed most rapidly by the sample) and determining a line segment of a linear approximation of each of a sequence of different portions of the DSC curve (and the slope of each such line segment), where the end points of each such curve portion span the same predetermined range of temperatures but each curve portion is centered at a different temperature below the peak melt temperature. Then, for consecutive pairs of the line segments having decreasing center temperatures (i.e., for center temperatures that decrease from the peak melt temperature), identifying the difference between the slopes of each such pair, identifying the first pair of line segments (for two consecutive portions of the curve portions) for which the line segment slope difference is indicative of an inflection point of the DSC curve, and identifying (as the inflection point of the DSC curve) the temperature at which the line segments of this pair intersect. The inflection point of the DSC curve for each polymer is considered to be the dry melt initiation temperature value MIT for the polymer.

The melt initiation temperatures listed in Table 1 are the dry melt initiation temperatures (MIT values) for the relevant polymers. The melt initiation temperatures listed in Table 1 were regressed to determine a "best fit" by least squares using the density and natural logarithm of the melt index (ln(MI)) for the relevant polymers. The regression line was:

$$MIT = 763.4\rho - 1.7524 \ln(MI) - 606.09 \tag{15}$$

where $\rho$ represents the density of the polymer (in units of g/cc), and MI represents the melt index, $I_2$, of the polymer (in units of dg/min).

In some embodiments, Equation 15 is used to determine the dry melt initiation temperature (MIT) for polymers other than those specifically listed in Table 1. In Equation 15, no term is employed to account for the specific catalyst type used to produce the polymer. This is appropriate since all combinations of polymer and catalyst type for which DSC measurements were performed were found to fit the correlation of Equation 15. However, it is anticipated that polymers produced by other catalyst systems (i.e., other than Catalysts A, B or C) may have MIT values that do not fit the regression curve defined by Equation 15.

Solubility parameters for these gases were obtained from the *Chemical Properties Handbook* 1999, and are listed in Table 2 below. A value for the of solubility parameter of polyethylene was obtained from an average of several values that are listed for polyethylene in the *Polymer Handbook, 4th* ed.

TABLE 2

| Solubility Parameters $((cal/cm^3)^{1/2})$ | |
|---|---|
| 1-Butene | 6.717 |
| n-Butane | 7.062 |
| Isopentane | 6.771 |
| 1-Hexene | 7.352 |
| n-Hexane | 7.323 |
| Polyethylene | 7.95 |

Table 3 shows an exemplary calculation, performed using the coded melt initiation temperature depression model for a polymer of the type produced by Catalyst A, with a melt index (MI) of 1.0 dg/min, and a density of 0.918 g/cc, being produced in a fluid bed reactor. The calculation was based on assumed values of condensable diluent gas concentrations, temperature, and pressure (as provided in the table) that are believed to be representative of Catalyst A in commercial operation.

TABLE 3

| | |
|---|---|
| 1-Hexene partial pressure (bar) | 0.217 |
| Isopentane partial pressure (bar) | 3.45 |
| Reactor temperature, Trx (° C.) | 85 |
| Reactor pressure (bar) | 21.7 |
| Polymer peak melting temp., $T_m^0$ (° C.) | 115.86 |
| Melt point depression, D (° C.) | 13.00 |
| Reduced peak melting temp., $T_m$ (° C.) | 102.86 |
| Melt initiation temp., MIT (° C.) | 94.71 |
| Reduced MIT, $MIT_R$ (° C.) | 81.71 |
| ΔMIT, at Trx = 85° C., (° C.) | 3.38 |

In the exemplary calculation, the dry melt initiation temperature (MIT) for the polymer was determined from the correlation of Equation 15. The melting point depression D was determined from Equations 4, 9, 10, and 11, (using the indicted values of temperature and diluent gas concentrations), and the resulting calculated value was 13° C. A value of reduced melt initiation temperature $MIT_R$. was determined as the difference MIT−D, which produced an estimated value of 81.71° C. Since this was lower than the reactor temperature (Trx) of 85° C., the calculation thus determined that (this example) system was operating with a positive value of ΔMIT equal to 3.38° C. Since this was less than the limiting range of ΔMIT values that apply for Catalyst A (6 to 8° C.), the reactor system would be expected to operate at the conditions above without excessive resin stickiness in the fluidized bed and, consequently, without an increased tendency for discontinuity events such as sheeting, chunking or fouling of the distributor plate or cooler caused by excessive stickiness.

Several embodiments of the inventive method which use the above-described MIT depression model allow linkage of resin properties and reactor operating conditions to predict operating conditions under which discontinuity events due to resin stickiness can be avoided during start-ups as well as steady-state operation. These embodiments allow production rates to be maximized (i.e., to proceed with maximum combinations of reactor temperature and ICA) while avoiding the conditions in the reactor (or combinations of conditions)) that would lead to excessive stickiness and discontinuity events. These embodiments use only readily available process and resin property data, and can be readily implemented at plant sites either on-line through process control systems (i.e., by processing the relevant data in a processor that has been programmed to implement the inventive method and calculations), or may be implemented off-line using available spreadsheets.

Several variations (or improvements) of the described examples of the inventive method that implement or otherwise use the above-described MIT depression model are contemplated:

other solubility correlations for ICA materials and comonomers can be employed;

other methods to predict (possibly more accurately) mutual solubilities in multi-component systems can be employed;

improved enthalpy of fusion values (ΔHu) can be employed to account for variation of ΔHu with polymer density. (It has been reported in the literature that ΔHu is a function of the polymer density.);

other equations may be used to predict the melting point depression, and dilatometry data can be used to predict (possibly more accurately) the polymer and diluent volume fractions.

Isomeric compounds (isomers of comonomers) present in fluid bed polymerization reactors are important in monitoring and optionally also controlling polymerization reactions occurring in the reactors (e.g., polyethylene polymerization reactions under metallocene catalyst polymerization conditions). Such isomeric compounds are relatively inert and can accumulate significantly in commercial reactors fitted with recovery systems. (Isomers of the comonomer are rarely observed in any substantial amount in pilot plants which do not operate with recovery systems.) Because these isomers can be present in substantial amounts in commercial reaction systems, they can have a significant impact of the melting point depression D and the reduced melt initiation temperature $MIT_R$ (or $MRT_R$). In a class, preferred embodiments of the invention recognize and account for the impact of accumulated isomers on the melting point depression D, and the resulting values of $MIT_R$ and ΔMIT (or $MRT_R$ and ΔMRT). Procedures to remedy the effects of accumulated isomers (such as controlled venting of the reactor as described below) may also be preferably implemented.

Gas chromatograph composition data for isomers in at least one commercial, gas phase, polyethylene polymerization reactor operating with a catalyst substantially equivalent to Catalyst A have been considered. The data were analyzed to characterize separately the 1-hexene comonomer and the $C_6$ and $C_6+$ isomers of the comonomer in samples of cycle gas from the reactor. The data indicated that isomer concentrations as high as 2.5 mole percent (of the total reactor gas) were obtained in the reactor system, which was substantially higher than the approximately 1 to 1.5 mole percent concentration of 1-hexene alone. Further, at these levels, the isomers themselves (excluding the comonomer) produced an increased depression of the MIT equal to 4° C., which represents a very significant potential impact on commercial operations, including the tendency for sheeting. It is expected that isomer concentrations greater than 2.5 mole percent would have a correspondingly greater impact on estimated degree of MIT depression and thus on likelihood of sheeting, unless corrective actions were taken (such as a reduction in the reactor temperature Trx) to maintain ΔMIT (or ΔMRT) within an acceptable range.

It is contemplated that the dry melt reference temperature (of a dry version of polymer resin being produced by polymerization) employed in various embodiments of the invention can be determined or defined in any of a number of different ways. For example, in some embodiments it is a peak polymer melt temperature determined from a first or second melt DSC measurement. In other embodiments, it is a polymer Seal Initiation Temperature measured on a resin film sample (for example, a seal initiation temperature as described in above-referenced U.S. Pat. No. 7,122,607), a resin Hot Tack Initiation Temperature (for example, a hot tack initiation temperature as described in U.S. Pat. No. 7,122, 607), a dry sticking temperature of granular polymer in a fluid bed (for example, a dry sticking temperature as described in U.S. Pat. No. 7,122,607), a Melt Initiation Temperature (MIT) determined graphically as the onset of rapid melting in a first or second melt DSC curve, a critical amorphous fraction determined from the melting distribution function (MDF), a dry sticking temperature at which agglomeration or fouling on any surface of the reactor vessel begins to occur with the reactor operating at normal pressure and gas velocity but in the presence of substantially pure nitrogen rather than the gas components actually present in the reactor during the reaction, or the temperature at which there is at least a 50% drop in bandwidth of a bed DP reading, where "bed DP reading" denotes measured pressure difference between the bottom and top of the fluid bed. Whatever method is employed to determine a melt reference temperature, it is important to ensure that a consistent method is used throughout the calculations, and that appropriate limits for ΔMRT (limits that apply for the particular melt reference temperature that is employed) are established, preferably through actual operating experience. In practice, limiting values of ΔMRT or ΔMIT are typically those values that correlate with an increased tendency for sheeting, chunking, and/or fouling of the distributor or cycle gas cooler.

Specific methods and systems for inferring polymer stickiness by calculating the melting curve depression have been described herein. However, it is also contemplated that the melting curve depression D can be can be determined or estimated in any of a number of different ways; for example, in ways that do not make use of the Flory equation, or that use correlations for the solubility of diluent gas components in the resin other than those presented in the examples. The inventors contemplate that other such methods may be constructively employed, as long as they provide an analysis of the diluent gas solubilities and the resulting depression of the polymer melting curve.

In a class of preferred embodiments, all condensable components that are present in significant amounts in the cycle gas stream (including isomers of the one or more comonomers) are measured and the step of determining estimated degree of MIT depression (or MRT depression) accounts for all such significant condensable components. This is important because isomers nevertheless may be present in small amounts, and may therefore have a substantial affect on the degree of MIT (or MRT) depression. Thus, consideration of the presence of isomers of each comonomer should be included as well as the ICA present. For example, if 1-hexene is used as the comonomer, the significant isomers may include 2-methyl-1-pentene, cis- and trans-2-hexene, and 3-hexene.

In some embodiments where all isomeric components are known, and solubility relationships for all the components are known, the total solubility of the isomers in the polymer product can be computed using Equation 13, by including appropriate parameters for each component. In other embodiments where carbon number is known (e.g. $C_4$, $C_6$, etc.) the solubility can be computed from Equation 13 using a total isomer concentration for each carbon number species. As such, a "lumped" value is expected to produce greater accuracy in computation of the degree of MIT (or MRT) depression since the solubilities for all of the individual isomer components of a given carbon number are expected to be similar.

Accurate accounting for isomers in determination of estimated degree of MIT or MRT depression is expected to provide benefits in many if not all embodiments of the invention, including those which generate reduced melt initiation temperature values (or ΔMIT values) based on bed-averaged parameters of steady-state reactions and use them to characterize and control the steady-state reactions, and those which generate reduced melt initiation temperature values (or ΔMIT values) based on instantaneous reaction parameters and use them to characterize and control the reactions during reaction transitions.

A specific control action to remedy the impact of isomers (of comonomers) on ΔMIT (or ΔMRT) is to vent isomers from the reactor/recycle system. Vented isomers may go to flare or to a recovery system separate from the reactor/recycle system of the reactor (which may be operating with a metallocene catalyst). As is well known to those skilled in the art, direct venting of the cycle gas to flare is possible, but is likely to be far from optimal due to the relatively high concentration of ethylene and other reactant gases that would also be vented in the process. A preferred point for extracting a vent is from the gas stream exiting the resin purging system. A gas vent from this location contains a relatively high concentration of isomers (up to 50 percent by weight), and a relatively low concentration of ethylene. Depending on specific designs, other reactor systems with other configurations of product discharge, purging and recovery systems may have different preferred vent points.

We next describe examples of commercial-scale reactions (e.g., commercial-scale, gas-phase fluidized-bed polymerization reactions) that can be monitored and optionally also controlled in accordance with embodiments of the invention. Some such reactions can occur in a reactor having the geometry of reactor 10 of FIG. 1 or reactor 100 of FIG. 6. In different embodiments of the invention, performance of any of a variety of different reactors is monitored and optionally also controlled in accordance with the invention.

In some embodiments, a continuous gas phase fluidized bed reactor is monitored and optionally also controlled in accordance with the invention while it operates to perform polymerization as follows; the fluidized bed is made up of polymer granules. Gaseous feed streams of the primary monomer and hydrogen together with liquid or gaseous comonomer are mixed together in a mixing tee arrangement and introduced below the reactor bed into the recycle gas line. For example, the primary monomer is ethylene and the comonomer is 1-hexene. The individual flow rates of ethylene, hydrogen and comonomer are controlled to maintain fixed gas composition targets. The ethylene concentration is controlled to maintain a constant ethylene partial pressure. The hydrogen is controlled to maintain a constant hydrogen to ethylene mole ratio. The hexene is controlled to maintain a constant hexene to ethylene mole ratio (or alternatively, the flow rates of comonomer and ethylene are held at a fixed ratio). The concentration of all gases is measured by an on-line gas chromatograph to ensure relatively constant composition in the recycle gas stream. A solid or liquid catalyst is injected directly into the fluidized bed using purified nitrogen as a carrier. The feed rate of catalyst is adjusted to maintain a constant production rate. The reacting bed of growing polymer particles is maintained in a fluidized state by a continuous flow of make up feed and recycle gas through the reaction zone (i.e. the fluidized bed). In some implementations, a superficial gas velocity of 2.0 to 2.8 ft/sec is used to achieve this, and the reactor is operated at a total pressure of 300 psig. To maintain a constant reactor temperature, the temperature of the recycle gas is continuously adjusted up or down to accommodate any changes in the rate of heat generation due to the polymerization. The fluidized bed is maintained at a constant height by withdrawing a portion of the bed at a rate equal to the rate of formation of particulate product. The product is removed semi-continuously via a series of valves into a fixed volume chamber, which is simultaneously vented back to the reactor. This allows for efficient removal of the product, while at the same time recycling a large portion of the unreacted gases back to the reactor. This product is purged to remove entrained and dissolved hydrocarbons and treated with a small steam of humidified nitrogen to deactivate any trace quantities of residual catalyst.

In other embodiments, a reactor is monitored and optionally also controlled in accordance with the invention while it operates to perform polymerization using any of a variety of different processes (e.g., slurry, or gas phase processes). For example, the reactor can be a fluidized bed reactor operating to produce polyolefin polymers by a gas phase polymerization process. This type of reactor and means for operating such a reactor are well known. In operation of such reactors to perform gas phase polymerization processes, the polymerization medium can be mechanically agitated or fluidized by the continuous flow of the gaseous monomer and diluent.

In some embodiments, a polymerization reaction that is a continuous gas phase process (e.g., a fluid bed process) is monitored and optionally also controlled in accordance with embodiments of the invention. A fluidized bed reactor for performing such a process typically comprises a reaction zone and a velocity reduction zone (also known as an expanded section). The reaction zone comprises a bed of growing polymer particles, formed polymer particles and a minor amount of catalyst particles fluidized by a continuous flow of reactor gas through the reaction zone. Optionally, some of the recirculated gases may be cooled and compressed to form liquids that increase the heat removal capacity of the circulating gas stream when readmitted to the reaction zone. This method of operation is referred to as "condensed mode." A suitable rate of gas flow may be readily determined by simple experiment. Make up of gaseous monomer, comonomer and hydrogen to the circulating gas stream is at a rate equal to the rate at which particulate polymer product and monomer associated therewith is withdrawn from the reactor, so as to maintain an essentially steady state gaseous composition within the reaction zone. The gas leaving the reaction zone is passed to the velocity reduction zone where entrained particles are removed. Finer entrained particles and dust may be removed in a cyclone and/or fines filter. The gas is compressed in a compressor and passed through a heat exchanger wherein the heat of polymerization is removed, and then returned to the reaction zone.

The reactor temperature (Trx) of the fluid bed process is normally operated at the highest temperature that is feasible, given the stickiness or sintering characteristics of the polymer in the fluid bed to maximize heat removal capabilities. The upper limit for the reactor temperature is believed to be or primarily related to the sintering temperature of the polymer product, and the sintering temperature is a function of condensable gas concentrations and product properties in the reactor. However, there is no generally recognized method in the art for establishing numerical limits for limiting the upper limit reactor temperature; and, similarly, there is no method in the art that provides a basis for adjusting (or changing) the limiting temperature to account for changes in condensable gas concentrations and product properties in the reactor.

In a class of embodiments, the present method provides for a quantitative basis for setting the temperature limits based on the $MIT_R$ (the temperature at which the onset of melting is expected to occur in the reactor) or $MRT_R$ (the reduced melt reference temperature, which is typically a temperature that is representative of the melting characteristics of the polymer as it exists in the reactor). The upper limit of reactor temperature may be preferably set just below (e.g. 1° C. to 3° C. below) the limiting value of $\Delta MIT$ (or $\Delta MRT$), defined above. The limiting value of $\Delta MIT$ thus provides a quantitative basis for setting the maximum reactor temperature based on current conditions in the reactor (including current values of condensable gas concentrations and resin product properties). The limiting value of $\Delta MIT$ is the maximum amount by which the reactor temperature can exceed the $MIT_R$ without causing discontinuity events, such as sheeting chunking, that are (based on the present teachings) the result of excessive stickiness in the polymer product.

In other embodiments, a reactor whose operation is monitored and optionally also controlled in accordance with the invention effects polymerization by a slurry polymerization process. Non-limiting examples of slurry processes include continuous loop or stirred tank processes. A slurry polymerization process generally uses pressures in the range of from 1 to 50 atmospheres, and temperatures in the range of 0° C. to 120° C., and more particularly from 30° C. to 100° C. In a slurry polymerization process, a slurry of solid, particulate polymer is formed in a liquid polymerization diluent medium to which monomer, comonomers, catalyst, and often hydrogen are added. The slurry including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and chemically non-reactive with the catalyst and monomers employed in the reactor system. In some embodiments, a hexane, isopentane or isobutane diluent is employed.

In other embodiments, a reaction monitored and optionally also controlled in accordance with the invention is or includes particle form polymerization, or a slurry process in which the temperature is kept below the temperature at which a substantial portion of the polymer goes into solution. In some embodiments, a particle form polymerization reaction monitored and optionally also controlled in accordance with the invention is a slurry loop reactor, in which a circulation pump is employed to circulate the slurry through heat exchanger tubes to remove the heat of polymerization. In the slurry loop embodiment, the temperature and pressure of the slurry polymerization process are preferably operated above the thermodynamic critical point of the diluent to avoid the possibility of cavitation in the slurry circulation pump. In other embodiments, a reaction monitored and optionally also controlled in accordance with the invention is carried out in a plurality of slurry loop reactors or stirred tank reactors in series, parallel, or combinations thereof.

A reaction monitored and optionally also controlled in accordance with some embodiments of the invention can produce homopolymers of olefins (e.g., homopolymers of ethylene), and/or copolymers, terpolymers, and the like, of olefins, particularly ethylene, and at least one other olefin. The olefins, for example, may contain from 2 to 16 carbon atoms in one embodiment; or ethylene and a comonomer comprising from 3 to 12 carbon atoms in another embodiment; or ethylene and a comonomer comprising from 4 to 10 carbon atoms in yet another embodiment; or ethylene and a comonomer comprising from 4 to 8 carbon atoms in yet another embodiment. A reaction monitored and optionally also controlled in accordance with the invention can produce polyethylenes. Such polyethylenes can be homopolymers of ethylene and interpolymers of ethylene and at least one α-olefin wherein the ethylene content is at least about 50% by weight of the total monomers involved. Exemplary olefins that may be utilized in embodiments of the invention are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

In the production of polyethylene or polypropylene, one or more comonomers may be present in the polymerization reactor. When present, the comonomer may be present at any level with the ethylene or propylene monomer that will achieve the desired weight percent incorporation of the comonomer into the finished resin. In one embodiment of polyethylene production, the comonomer is present with ethylene in a mole ratio range in the gas phase of from 0.0001 (comonomer:ethylene) to 50, and from 0.0001 to 5 in another embodiment, and from 0.0005 to 1.0 in yet another embodiment, and from 0.001 to 0.5 in yet another embodiment. Expressed in absolute terms, in making polyethylene, the amount of ethylene present in the polymerization reactor may range to up to 1000 atmospheres pressure in one embodiment, and up to 500 atmospheres pressure in another embodiment, and up to 100 atmospheres pressure in yet another embodiment, and up to 50 atmospheres in yet another embodiment, and up to 10 atmospheres in yet another embodiment.

Hydrogen gas is often used in olefin polymerization to control the final properties of the polyolefin. For some types of catalyst systems, it is known that increasing concentrations (or partial pressures) of hydrogen reduce the molecular weight and increase the melt index (MI) of the polyolefin generated. The MI can thus be influenced by the hydrogen concentration. The amount of hydrogen in the polymerization can be expressed as a mole ratio relative to the dominant polymerizable monomer that is present in the reactor; for example, ethylene or propylene. The amount of hydrogen used in some polymerization processes is an amount necessary to achieve the desired MI (or molecular weight) of the final polyolefin resin. In one embodiment, the mole ratio in the gas phase of hydrogen to total monomer ($H_2$:monomer) is greater than 0.00001. The mole ratio is greater than 0.0005 in another embodiment, greater than 0.001 in yet another embodiment, less than 10 in yet another embodiment, less than 5 in yet another embodiment, less than 3 in yet another embodiment, and less than 0.10 in yet another embodiment, wherein a desirable range may comprise any combination of any upper mole ratio limit with any lower mole ratio limit described herein. Expressed another way, the amount of hydrogen in the reactor at any time may range to up to 10 ppm in one embodiment, or up to 100 or 3000 or 4000 or 5000 ppm in other embodiments, or between 10 ppm and 5000 ppm in yet another embodiment, or between 500 ppm and 2000 ppm in another embodiment.

A reactor monitored and optionally also controlled in accordance with some embodiments of the invention can be an element of a staged reactor employing two or more reactors in series, wherein one reactor may produce, for example, a high molecular weight component and another reactor may produce a low molecular weight component.

A reactor monitored and optionally also controlled in accordance with the invention can implement a slurry or gas phase process in the presence of a metallocene or metallocene-type catalyst system and in the absence of, or essentially free of, any scavengers, such as triethylaluminum, trimethylaluminum, tri-isobutylaluminum and tri-n-hexylaluminum and diethyl aluminum chloride, diethyl zinc and the like. By "essentially free", it is meant that these compounds are not deliberately added to the reactor or any reactor components, and if present, are present to less than 1 ppm in the reactor.

A reactor monitored and optionally also controlled in accordance with the invention can employ one or more catalysts combined with "continuity additives" or other "antistatic agents" to control reactor static and carryover static, as described in U.S. Patent Application Publication No. 2005/0148742. In some embodiments, the continuity additive is a metal-fatty acid compound (such as aluminum stearate), which is fed to the reactor in amounts up to 50 ppm (based on the polymer production rate. In other embodiments, the continuity additive can be an antistatic agent, such as an ethoxylated or methoxylated amine, an example of which is Kemamine AS-990 (ICI Specialties, Bloomington Del.) (or combinations thereof). Other antistatic compositions include the Octastat family of compounds, more specifically Octastat 2000, 3000, and 5000. Other embodiments may include combinations of metal-fatty acids and antistatic compounds in amounts up to 100 ppm based on the polymer production rate.

In a reactor monitored and optionally also controlled in accordance with some embodiments of the invention, supported catalyst(s) may be combined with up to 6 wt % of continuity additives, prior to introduction to the reactor. The continuity additives are added to the catalyst by tumbling and/or other suitable means. In Catalyst A, for example, 3.0 wt % of aluminum stearate and 2.0 wt % Kemamine AS-990 are combined with the catalyst, prior to its introduction to the reactor.

In other embodiments, the metal fatty acids and/or antistatic agents are added as one or more separate feeds to the reactor; for example, as a slurry of the additive or antistatic agent in hydrocarbon diluents, as a solution in hydrocarbon diluents, or as a direct feed of solid particles (preferably as powders). One advantage of this method of addition is that it permits on-line adjustment of the feed rate of the additive, independent of the rate of catalyst feed. In other embodiments, the continuity additive(s) is added to the recycle line.

Examples of polymers that can be produced in accordance with the invention include the following: homopolymers and copolymers of $C_2$-$C_{18}$ alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; and polychloroprene; norbornene homopolymers and copolymers with one or more $C_2$-$C_{18}$ alpha olefin; terpolymers of one or more $C_2$-$C_{18}$ alpha olefins with a diene.

Monomers that can be present in a reactor monitored and optionally also controlled in accordance with the invention include one or more of: $C_2$-$C_{18}$ alpha olefins such as ethylene, propylene, and optionally at least one diene, for example, hexadiene, dicyclopentadiene, octadiene including methyloctadiene (e.g., 1-methyl-1,6-octadiene and 7-methyl-1,6-octadiene), norbornadiene, and ethylidene norbornene; and readily condensable monomers, for example, isoprene, styrene, butadiene, isobutylene, chloroprene, acrylonitrile, cyclic olefins such as norbornenes.

Fluidized bed polymerization can be monitored and optionally also controlled in accordance with some embodiments of the invention. The reaction can be any type of fluidized polymerization reaction and can be carried out in a single reactor or multiple reactors such as two or more reactors in series.

In various embodiments, any of many different types of polymerization catalysts can be used in a polymerization process monitored and optionally also controlled in accordance with the present invention. A single catalyst may be used, or a mixture of catalysts may be employed, if desired.

The catalyst can be soluble or insoluble, supported or unsupported. It may be a prepolymer, spray dried with or without a filler, a liquid, or a solution, slurry/suspension or dispersion. These catalysts may be used with cocatalysts and promoters well known in the art. Typically the cocatalysts and promoters may include alkylaluminums, alkylaluminum halides, alkylaluminum hydrides, as well as aluminoxanes. For illustrative purposes only, examples of suitable catalysts include Ziegler-Natta catalysts, chromium based catalysts, vanadium based catalysts (e.g., vanadium oxychloride and vanadium acetylacetonate), metallocene catalysts and other single-site or single-site-like catalysts as well as constrained geometry catalysts, cationic forms of metal halides (e.g., aluminum trihalides), anionic initiators (e.g., butyl lithiums), cobalt catalysts and mixtures thereof, nickel catalysts and mixtures thereof, iron catalysts and mixtures thereof, rare earth metal catalysts (i.e., those containing a metal having an atomic number in the Periodic Table of 57 to 103), such as compounds of cerium, lanthanum, praseodymium, gadolinium and neodymium.

In various embodiments, a polymerization reaction monitored and optionally also controlled in accordance with the invention can employ other additives, such as (for example) inert particulate particles.

It is to be understood that while the invention has been described in conjunction with the specific embodiments and examples thereof, the foregoing description is intended to illustrate and not limit the scope of the invention. Other aspects, advantages and modifications will be apparent to those skilled in the art to which the invention pertains.

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

What is claimed is:

1. A method for monitoring a polymerization reaction in a fluidized bed reactor, the method comprising the steps of:
   (a) generating, in on-line fashion, carryover static data indicative of carryover static;
   (b) generating, in on-line fashion, reaction parameter data indicative of resin stickiness, where said reaction parameter data is neither carryover static data nor bed static data, and wherein acoustic emission sensors are used to generate at least some of said reaction parameter data;
   (c) generating, in on-line fashion, temperature data, using at least one of said reaction parameter data, where the temperature data is indicative of a characteristic of melting behavior of a polymer resin in the reactor in the presence of at least one diluents, and where the temperature data includes $MRT_R$, a reduced melt reference temperature for the polymer resin in the reactor, wherein $MRT_R$ is at least substantially equal to the difference between the dry melt reference temperature and a melt reference temperature depression value, D, where D is a temperature by which the dry melt reference temperature is depressed by the presence of diluent with the polymer resin in the reactor; and
   (d) controlling the reaction in response to the data generated in steps (a), (b), and (c) in an effort to prevent the occurrence of a discontinuity event.

2. The method of claim 1, wherein step (a) comprises the step of generating carryover static data while monitoring the reaction using at least one static probe positioned to monitor static charge outside the fluidized bed.

3. The method of claim 1, wherein step (a) comprises the step of generating carryover static data while monitoring the reaction using at least one bi-polar static probe.

4. The method of claim 1, wherein the temperature data is indicative of a bed-averaged characteristic of melting behavior of the polymer resin in the reactor in the presence of at least one diluent.

5. The method of claim 1, also comprising the step of using at least one high speed skin thermocouple to determine at least one said monitored reaction parameter used during step (c).

6. The method of claim 1, wherein the dry melt reference temperature is a seal initiation temperature of bed averaged polymer produced in the reactor.

7. The method of claim 1, also comprising the steps of:
   determining a stickiness control parameter from the reduced melt reference temperature; and
   controlling the reaction in response to the stickiness control parameter and in response to the carryover static data generated in step (a).

8. The method of claim 1, wherein step (a) comprises the step of generating the bed static data using at least one static probe positioned to monitor static charge in the fluidized bed.

9. The method of claim 8, wherein the reaction proceeds in the presence of at least one metallocene catalyst, and also comprising the step of controlling the reaction in an effort to prevent imminent occurrence of wall sheeting in response to determining that bed static charge has become negative.

10. The method of claim 1, wherein the reactor comprises a gas recycle line, the carryover static data are entrainment static data indicative of entrainment static, and step (a) comprises the step of generating at least some of the entrainment static data using at least one static probe positioned to monitor static charge in the gas recycle line.

11. The method of claim 1, wherein the reactor comprises a gas recycle line and an annular disk mounted near to an outlet of the gas recycle line, and step (a) comprises the step of generating at least some of the carryover static data using at least one static probe mounted near to the annular disk.

12. The method of claim 1, wherein the reactor comprises a distributor plate, and step (a) comprises the step of generating at least some of the carryover static data using at least one static probe positioned near to the distributor plate.

13. The method of claim 1, wherein the temperature data generated in step (c) are generated by:
(i) during the reaction, monitoring reaction parameters comprising at least reactor temperature, at least one resin property of the polymer resin, and concentration of at least one condensable diluent gas in the reactor;
(ii) determining from the at least one resin property, using a predetermined correlation between resin melting temperature and said at least one resin property, a dry melt initiation temperature of a dry version of the polymer resin;
(iii) during the reaction, using a melt initiation temperature depression model to determine, in on-line fashion from at least some of the parameters monitored in step (i) and the dry melt initiation temperature, a reduced melt initiation temperature for the polymer resin in the presence of the at least one condensable diluent gas, said melt initiation temperature depression model identifying an estimated degree of depression of the dry melt initiation temperature due to presence of at least one diluent with the polymer resin; and
(iv) determining the temperature data in on-line fashion from the reduced melt initiation temperature and a current value of the reactor temperature.

14. The method of claim 13, wherein the melt initiation temperature depression model implements the Flory melt depression equation.

15. The method of claim 13, wherein the first temperature is a temperature value $\Delta MIT$ that is at least substantially equal to $Trx-MIT_R$, where $Trx$ is a current value of the reactor temperature, and $MIT_R$ is the reduced melt initiation temperature determined in step (iii).

16. The method of claim 13, wherein step (iii) comprises the step of processing said at least some of the parameters monitored in step (i) and the dry melt initiation temperature value in a processor programmed to implement the melt initiation temperature depression model.

17. The method of claim 1, also comprising controlling the reaction in an effort to prevent occurrence of excessive resin stickiness in the reactor.

18. The method of claim 1, also comprising controlling the reaction in an effort to maximize reactor production rate while preventing occurrence of excessive resin stickiness in the reactor.

19. The method of claim 1, also comprising:
in response to carryover static data generated in step (a) indicating excessive entrainment static, controlling the reaction in an effort to prevent dome sheeting.

20. The method of claim 1, also comprising:
in response to static data generated in step (a) and indicative of time-averaged current transferred to an electrode of a static probe at a site of potential sheeting, controlling the reaction in an effort to prevent sheeting at the site.

21. The method of claim 1, also comprising:
in response to reaction parameter data generated during step (b) and indicative of a critical temperature below which resin in the reactor is not expected to become sticky, controlling the reaction to maintain the reactor temperature below the critical temperature.

22. The method of claim 1, also comprising:
in response to temperature data generated in step (c) and indicative of a critical temperature below which resin in the reactor is not expected to become sticky, controlling the reaction to maintain the reactor temperature below the critical temperature.

23. The method of claim 1, also comprising:
(e) monitoring, in on-line fashion, concentration of at least one condensable diluent present in the reactor with polymer resin being produced.

24. The method of claim 23, wherein step (e) comprises monitoring, in on-line fashion, concentration of at least one induced condensing agent in the reactor, concentration of at least one comonomer in the reactor, and concentration at least one isomer of the comonomer in the reactor.

25. The method of claim 23, also comprising controlling the reaction in response to data indicative of monitored concentration of each of the at least one condensable diluent in an effort to prevent excursions in monitored diluent concentration that could cause at least one of resin stickiness, sheeting, distributor plate fouling, and cycle gas cooler fouling.

26. The method of claim 1, also comprising:
generating skin temperature values by monitoring skin temperature of the reactor;
generating wall delta temperature values by subtracting a calculated dew point temperature of gas in the reactor from each of the temperature values.

27. The method of claim 26, also comprising controlling the reaction in an effort to prevent occurrence of sheeting in response to determination of an approach to zero of at least one of the wall delta temperature values.

28. The method of claim 1, wherein the polymer resin is polyethylene and each said comonomer is a $C_3$-$C_{10}$ alpha olefin.

29. The method of claim 1, wherein the polymer resin is a polyolefin.

30. The method of claim 1, wherein the polymer resin is polyethylene.

* * * * *